(12) United States Patent
Kojima et al.

(10) Patent No.: US 6,799,267 B2
(45) Date of Patent: Sep. 28, 2004

(54) PACKET PROCESSOR

(75) Inventors: Yuji Kojima, Kawasaki (JP); Tetsumei Tsuruoka, Kawasaki (JP); Kenichi Abiru, Kawasaki (JP); Yasuyuki Umezaki, Fukuoka (JP); Yoshitomo Shimozono, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 614 days.

(21) Appl. No.: 09/742,939

(22) Filed: Dec. 20, 2000

(65) Prior Publication Data

US 2001/0020266 A1 Sep. 6, 2001

(30) Foreign Application Priority Data

Mar. 6, 2000 (JP) ........................................ 2000-061250

(51) Int. Cl.[7] ........................ G06F 9/302; G06F 15/163
(52) U.S. Cl. ........................ 712/225; 712/300; 712/221; 709/236
(58) Field of Search ................................ 370/468, 474, 370/512; 712/29, 30, 225, 300, 221; 709/236

(56) References Cited

U.S. PATENT DOCUMENTS 5,710,773 A * 1/1998 Shiga .......................... 370/512
5,845,042 A * 12/1998 Yanagihara .................. 386/81
6,587,476 B1 * 7/2003 Lewin et al. ................ 370/467

* cited by examiner

*Primary Examiner*—Daniel H. Pan
(74) *Attorney, Agent, or Firm*—Katten Muchin Zavis Rosenman

(57) ABSTRACT

A packet processor having a general-purpose arithmetic operator and another dedicated circuit, which extracts a particular field from the general-purpose register as object field, on which the predetermined general-purpose arithmetic operation is to be performed by the general-purpose arithmetic operator and writes a result of the arithmetic operation by the general-purpose arithmetic operator into the general-purpose register as updated information of the particular field. Based on the extraction and write process of the packet field designated by software (instructions), the packet processor realizes high flexibility and high speed processing.

8 Claims, 20 Drawing Sheets

PRINCIPLE OF FIELD EXTRACTION PROCESS (REPLACEMENT)

PRINCIPLE OF FIELD EXTRACTION PROCESS (ADDITION)

PRINCIPLE OF FIELD WRITE PROCESS

EXAMPLE OF FIELD WRITE PROCESS

FIG. 8

| KIND OF INSTRUCTION | INSTRUCTION MNEMONIC | EXECUTING ARITHMETIC OPERATOR | CONTENT OF OPERATION. |
|---|---|---|---|
| CONTROL | NOP | GENERAL-PURPOSE | NO OPERATION : EXECUTE NOTING BUT CONSUME CLOCK CYCLE. |
| DATA TRANSFER | LDI | GENERAL-PURPOSE | LOAD IMMEDIATE. |
| DATA TRANSFER | MOVE | GENERAL-PURPOSE | MOVE DATA BY WORD UNIT BETWEEN REGISTERS. |
| DATA TRANSFER / FIELD-EXTRACTION/WRITE OPERATION | LDPTR | FIELD EXTRACTION/WRITING UNIT | EXTRACT FIELD ( REPLACEMENT ). |
| DATA TRANSFER / FIELD-EXTRACTION/WRITE OPERATION | LDPTO | FIELD EXTRACTION/WRITING UNIT | EXTRACT FIELD ( ADDITION ). |
| DATA TRANSFER / FIELD-EXTRACTION/WRITE OPERATION | STPT | FIELD EXTRACTION/WRITING UNIT | WRITE INTO FIELD. |
| INTEGER NUMBER ARITHMETIC OPERATION | ADD | GENERAL-PURPOSE | ADD INTEGER NUMBERS BY WORD UNIT. |
| INTEGER NUMBER ARITHMETIC OPERATION | ADC | GENERAL-PURPOSE | ADD INTEGER NUMBERS BY CARRY-DIGIT UNIT AND WORD UNIT. |
| INTEGER NUMBER ARITHMETIC OPERATION | ADW | GENERAL-PURPOSE | ADD INTEGER NUMBERS BY HALF-WORD UNIT ( LOWER BIT ). SET CARRY FLAG IF CARRY DIGIT EXCEEDING HALF WORD IN GENERATED. |
| INTEGER NUMBER ARITHMETIC OPERATION | AWC | GENERAL-PURPOSE | ADD INTEGER NUMBERS BY CARRY-DIGIT UNIT AND HALF-WORD UNIT. SET CARRY FLAG IF CARRY DIGIT EXCEEDING HALF WORD IN GENERATED. |
| INTEGER NUMBER ARITHMETIC OPERATION | SUB | GENERAL-PURPOSE | SUBTRACT INTEGER NUMBERS BY WORD UNIT. |
| INTEGER NUMBER ARITHMETIC OPERATION | SBB | GENERAL-PURPOSE | SUBTRACT INTEGER NUMBERS BY WORD UNIT AND SUBTRACT BORROW DIGITS. |
| INTEGER NUMBER ARITHMETIC OPERATION | SBW | GENERAL-PURPOSE | SUBTRACT INTEGER NUMBERS BY HALF-WORD UNIT. SET CARRY FLAG IF BORROW DIGIT EXCEEDING HALF WORD IS GENERATED. |
| INTEGER NUMBER ARITHMETIC OPERATION | SWB | GENERAL-PURPOSE | SUBTRACT INTEGER NUMBERS BY HALF-WORD UNIT AND SUBTRACT BORROW DUGITS. SET CARRY FLAG IF BORROW DIGIT EXCEEDING HALF WORD IS GENERATED. |
| LOGICAL ARITHMETIC OPERATION | OR | GENERAL-PURPOSE | TAKE LOGICAL SUM ( OR ) BY WORD UNIT. |
| LOGICAL ARITHMETIC OPERATION | AND | GENERAL-PURPOSE | TAKE LOGICAL PRODUCT ( AND ) BY WORD UNIT. |
| LOGICAL ARITHMETIC OPERATION | XOR | GENERAL-PURPOSE | TAKE EXCLUSIVE LOGICAL SUM ( EXOR ) BY WORD UNIT. |
| LOGICAL ARITHMETIC OPERATION | NOT | GENERAL-PURPOSE | REVERSE BY WORD UNIT. |
| LOGICAL ARITHMETIC OPERATION | SFL | GENERAL-PURPOSE | SHIFT LEFTWARD ( THE MSB SIDE ) AND SET "0"S BITS IN THE LSB SIDE. |
| LOGICAL ARITHMETIC OPERATION | ROTL | GENERAL-PURPOSE | ROTATE LEFTWARD. |
| LOGICAL ARITHMETIC OPERATION | SFR | GENERAL-PURPOSE | SHIFT RIGHTWARD ( THE LSB SIDE ) AND SET "0"S BITS IN THE MSB SIDE. |
| LOGICAL ARITHMETIC OPERATION | ROTR | GENERAL-PURPOSE | ROTATE RIGHTWARD. |
| BIT ARITHMETIC OPERATION | BSF | GENERAL-PURPOSE | RETRIEVE SOURCE OPERAND FROM THE LSB TO FIND BIT LOCATION OF THE FIRST "1" BIT. SET "0" TO CARRY DIGIT IF BIT LOCATION IS HIT, OR SET "1" TO CARRY DIGIT IF BIT LOCATION IS NOT HIT. |
| BIT ARITHMETIC OPERATION | BSR | GENERAL-PURPOSE | RETRIEVE SOURCE OPERAND FROM THE MSB TO FIND BIT LOCATION OF THE FIRST "1" BIT. SET "0" TO CARRY DIGIT IF BIT LOCATION IS HIT, OR SET "1" TO CARRY DIGIT IF BIT LOCATION IS NOT HIT. |
| BIT ARITHMETIC OPERATION | BT | GENERAL-PURPOSE | SET CARRY FLAG IN FLAG REGISTER BY BIT VALUE OF SOURCE OPERAND #2 OF SOURCE OPERAND #1. |

FIG. 9

| SERIAL NUMBER | INSTRUCTION SEQUENCE OF GENERAL-PURPOSE ARITHMETIC OPERATOR | | INSTRUCTION SEQUENCE OF FIELD EXTRACTING/WRITING UNIT | |
|---|---|---|---|---|
| | EXECUTION CYCLE | INSTRUCTION | EXECUTION CYCLE | INSTRUCTION |
| 1 | n | ANOTHER OPERATION #1 | m | ANOTHER FIELD EXTRACTION/ WRITE PROCESS #3 |
| 2 | n+1 | | m+1 | |
| 3 | n+2 | | m+2 | AL LDPTR r15 r5 r14 |
| 4 | n+3 | AL SUB r15 r15 $1 | m+3 | AL NOP |
| 5 | n+4 | ANOTHER OPERATION #2 | m+4 | AL STPT r5 r15 r14 |
| 6 | n+5 | | m+5 | ANOTHER FIELD EXTRACTION/ WRITE PROCESS #4 |
| 7 | n+6 | | m+6 | |

FIG. 12

| SERIAL NUMBER | INSTRUCTION SEQUENCE OF GENERAL-PURPOSE ARITHMETIC OPERATOR OR FIELD EXTRACTING/WRITING UNIT | | |
|---|---|---|---|
| | EXECUTION CYCLE | EXECUTING ARITHMETIC OPERATOR | INSTRUCTION |
| 1 | n | GENERAL-PURPOSE ARITHMETIC OPERATOR | ANOTHER OPERATION |
| 2 | n+1 | | |
| 3 | n+2 | | |
| 4 | n+3 | FIELD EXTRACTING/WRITING UNIT | AL_LDPTR r15 r7 r12 |
| 5 | n+4 | | AL_LDPTO r15 r8 r13 |
| 6 | n+5 | GENERAL-PURPOSE ARITHMETIC OPERATOR | RETRIEVING PROCESS |
| 7 | n+6 | | |
| 8 | n+7 | | |

FIG. 15

| SERIAL NUMBER | INSTRUCTION SEQUENCE OF GENERAL-PURPOSE ARITHMETIC OPERATOR AND FIELD EXTRACTING/WRITING UNIT ||
| --- | --- | --- |
| | EXECUTION CYCLE | INSTRUCTION |
| 1 | n | ANOTHER OPERATION #1 |
| 2 | n+1 | |
| 3 | n+2 | AL NOP LDPTR r15 r5 r14 |
| 4 | n+3 | AL SUB r15 r15 $1 NOP |
| 5 | n+4 | AL NOP STPT r5 r15 r14 |
| 6 | n+5 | ANOTHER OPERATION #2 |
| 7 | n+6 | |

FIG. 17

| SERIAL NUMBER | INSTRUCTION SEQUENCE OF GENERAL-PURPOSE ARITHMETIC-FIELD EXTRACTING/WRITING UNIT ||
|---|---|---|
| | EXECUTION CYCLE | INSTRUCTION |
| 1 | n | |
| 2 | n+1 | ANOTHER OPERATION #1 |
| 3 | n+2 | |
| 4 | n+3 | AL LDPTR r15 r5 r14 |
| 5 | n+4 | AL SUB r15 r15 $1 |
| 6 | n+5 | AL STPT r5 r15 r14 |
| 7 | n+6 | |
| 8 | n+7 | ANOTHER OPERATION #2 |
| 9 | n+8 | |

PACKET PROCESSOR

BACKGROUND OF THE INVENTION

1. Field of the Invention

This invention relates to a packet processor, and more particularly to a packet processor which is suitable for use in a packet router for executing various packet processes, to update a packet header

2. Description of Related Art

Nowadays, with a spread usage of network for inter-terminal communications, there is an increased necessity of interconnecting networks, such as between LANs (Local Area Network) via an LAN and a leased line. Most of the networks currently in operation are those by the IP (Internet Protocol).

The IP is a communication protocol of connectionless type corresponding to the network layer of the OSI (Open System Interconnection) layer model of the ISO (International Organization for Standardization). The communication between terminals using the IP (IP communication), unlike the connection-type protocol, which secures a communication route between the terminals in advance, is realized by routing a packet in which communication data is stored based on the destination information (destination IP address) through the packet router interconnecting LANs.

When a packet is routed in the IP network, packet processing, such as calculating a check sum of a packet header, retrieving the destination table and updating a packet header, is required. Further, the IP network is also necessary to be equipped with a packet filter, which restricts the communication on the network. Since executing such processes employing dedicated hardware is too complicated, the processing are usually executed by software.

FIG. 18 of accompanying drawing is a block diagram schematically showing a conventional packet router. The packet router 100 includes packet receiving/processing units 101 and packet transmitting/processing units 103 as many as the connected networks (LANs 104 in FIG. 18). The packet router 100 is also equipped with a switch fabric (switching unit) 102 which guides a packet received in the packet receiving/processing unit 101 to a desired packet transmitting/processing unit 103.

When a packet is routed by the packet router 100, a packet received by the receiving interface 111 of the packet receiving/processing unit 101 is temporarily stored into a memory 112 via a bus 114. Then calculating the check sum, retrieving the destination table and updating the header of the packet stored in the memory 112 are executed by the packet processor 113 (hereinafter also called the processor).

The received packet having updated information, such as destination information decided by the packet processing of the processor 113, is transmitted to the switch fabric 102 via the bus 114. The received packet is further transmitted to a transmitting interface 131 of an appropriate transmitting/processing unit 103 by the switch fabric 102 in accordance with the decided destination information, and then the transmitting interface transmits the packet to the destination LAN 104. In this manner, the packet router 100 routes a packet received from the desired LAN 104 to the destination LAN 104 based on the destination information of the packet.

The packet processing performed by the processor 113 will now be described in detail. FIG. 19 is a block diagram focused on the memory 112 and the packet processor 113.

The packet processor 113 includes an external bus interface 121, an external bus buffer 122, a general-purpose arithmetic operator 123, a general-purpose register 124, a program counter 125, a flag register 126, and a controller 127.

The external bus interface 121 is used for interfacing with the bus 114, and packet data is transferred between the processor 113 and the memory 112 via the external bus interface 121. The external bus buffer 122 is used for temporarily storing received packet data to be packet processed in future. The general-purpose operator 123 performs various arithmetic operations, such as an integer number arithmetic operation, a logical arithmetic operation, and a bit arithmetic operation, in accordance with an instruction input from an instruction decoder 128 of the controller 127. These various arithmetic operations result in transferring, comparing and arithmetic-operating of the packet data.

The general-purpose register 124 (composite of sixteen registers r0 through r15) is used for storing received packet data and retaining source data to be arithmetic-operated and results of arithmetic operations. Selectors 124a, 124b, which are respectively disposed in opposite sides of the general-purpose register 124, select a source register from which the data is output (extracted), or a destination register to which data is input in the general-purpose register 124 (r0 through r15).

The program counter 125 retains the position of an instruction, which is currently executed, in a program, and increments its counts one by one in response to the execution of individual instructions. The flag register 126 evaluates the result of arithmetic operation performed in the general-purpose arithmetic operator 123. The controller 127 decodes instructions, which are input via the external bus interface 121, (by the instruction decoder 128) to give control signals to individual components of the processor 113. The instructions may be retained in the memory 112, which stores received packets, or in a dedicated external memory.

In the above-mentioned processor 113, the received packet data is read from the memory 112 to transfer to the general-purpose register 124 in accordance with a data-transfer instruction from the controller 127 (instruction decoder 128). Then the processor 113 performs a series of the packet processing, such as retrieving the destination table, calculating the header check sum and updating the destination address of the packet header, on the packet data stored in the general-purpose register 124 in accordance with an instruction from the controller 127 (the instruction decoder 128).

At that time, the processor 113 extracts a particular field (such as the TTL (Time To Live) field), whose bit length is not limited to the same as that of the general-purpose register 124 (32 bits in the illustrated example), from an arbitrary register ri (i is an integer number between 0 and 15), and the extracted particular field is stored into another register ri as work memory where packet processing is executed. After the packet processing on the particular field, the particular field is written into the source register ri, as the last part of the series of the packet processing, in units of the bit length of the general-purpose register 124.

Then the packet processor 113 transfers the updated packet data stored in the general-purpose register 124 back to the memory 112 when a demand arises, and properly transmits a processed packet to the switch fabric 102 from the memory 112 via the bus 114. The processor 113 stores received packets in the general-purpose register 124 to repeatedly perform extraction and writing of the particular fields, and updates the packet fields. As a result, appropriate packet processing can be realized using the processor 113.

As the modern networks increase in capacity and speed, higher-speed packet routing process is demanded. However, since the bit length (alignment) of a packet field to be processed does not always match with the bit length of the general-purpose register 124, the above-mentioned processor 113 cannot perform the packet processing at high speed.

Assuming that the general-purpose register 124 has a bit length of 32 bits and the packet format is the Ethernet format as shown in FIG. 20, the processor 113 stores the IP address (SA (Source Address) of 32 bits or DA (Destination Address) of 32 bits) of 32 bits separately into the two succeeding registers ri, 16 bits each, as the packet header is stored into the general purpose-register 124. When the packet processor 113 executes a field extraction process, which extracts particular field from the packet data stored in the general-purpose register 124, and also a field write process in accordance with a data-transfer instruction, the processor 113 has to perform a shift arithmetic operation and a mask arithmetic operation, which updates the field except for the particular field to "0"s, in the arithmetic operator 123 in addition to transferring data from the memory 112. As a result, the shift arithmetic operation and the mask arithmetic operation require extra clock cycles so that the conventional processor 113 cannot execute high-speed packet processing with ease, which has been demanded by the modern networks.

As one solution, there is an idea of executing a high-speed packet processing employing a dedicated hardware circuit. However, such dedicated hardware circuit cannot easily keep up with a revise of protocols and change of functions aimed for an improvement service as a network. Further, another dedicated hardware circuits are required so as to manage each of such revises and changes.

On the contrary, the processor 113 performs the packet processing consulting with instructions, i.e. software (programs). Therefore the processor 113 has high flexibility such as to easily cope with a revise of protocols and a change of functions aimed for an improved service as a network after the processor has been completely structured. The high-speed extraction/writing of a packet field taking great advantage of the flexibility of the processor 113 is indispensable for high-speed routing.

SUMMARY OF THE INVENTION

With the foregoing problems in view, it is an object of the present invention to provide a high-flexibility packet processor, which can execute extraction and write processes of a packet field at high speed in accordance with software (instructions).

To attain the above object, according to a first generic feature of the present invention, there is a packet processor comprising: a general-purpose register for retaining packet data; a general-purpose arithmetic operator for performing a predetermined general-purpose arithmetic operation on a particular field of the packet data, which is retained by the general-purpose register, in accordance with a general-purpose arithmetic operation instruction; a dedicated field extracting circuit for performing a field extraction process of extracting information of the particular field from the general-purpose register as object field information, on which the predetermined general-purpose arithmetic operation is to be performed by the general-purpose arithmetic operator, in accordance with a field extraction instruction; and a dedicated field writing circuit for performing a field write process of writing a result of the arithmetic operation by the general-purpose arithmetic operator into the general-purpose register as updated information of the particular field in accordance with a field write instruction.

With the above-mentioned packet processor, since the dedicated circuit extracts information of the particular field from packet data stored in the general-purpose register and writes a result of arithmetic operation by the general-purpose arithmetic operator into the general-purpose register as updated information of the particular field in accordance with the instructions, the extraction process and write process of the particular field, which is an object for the processes by the general-purpose arithmetic operator, can be performed at high speed. As a result, a packet processor having high flexibility using instructions and high-speed performance can be realized.

As a preferable feature, the dedicated field extracting circuit and the dedicated field writing circuit may be in the form of a shared composite circuit dedicated to field extraction and field write, which result in an decreased size in the circuit scale.

As another preferable feature, the packet processor may comprise an instruction retaining section for retaining a field-extraction-and-field-write bit pattern, which represents a bit position of the particular field in the general-purpose register, and a bit rotation extent of the particular field in the general-purpose register as a composite instruction, and the shared composite circuit dedicated to field extracting and field writing may be operative to perform the field extraction process and the field write process based on the composite instruction retained in the instruction retaining section. With the packet processor having this preferable feature, since a shift arithmetic operation and a mask arithmetic operation of the particular field, likewise the conventional packet processor, do not have to be performed, field extraction and field write processes can be performed in higher speed.

As still another preferable feature, the instruction retaining section and the general-purpose register may be in the form of a composite register for retaining both the composite instruction and the packet data. With this composite register, an instruction to the particular field does not have to be designated and retained in a dedicated register by the name thereof different from the name of another register retaining the packet data. As a result, programming efficiency can be improved because of the shorter-length of an instruction and less storage area for retaining instruction.

As a further preferable feature, the general-purpose arithmetic operator and the shared composite circuit, which is dedicated to field extracting and field writing, may be (1) individually operated in accordance with two different programs separately describing unique procedures associated with the respective dedicated instructions, (2) operated in accordance with a shared program collectively describing unique procedures associated with the respective dedicated instructions, or (3) operated in accordance with a shared program describing unique procedures associated with a composite instruction that includes an instruction dedicated to field extracting/writing and also an instruction dedicated to an arithmetic operation.

In the case of the two different programs ((1)) since the arithmetic operation and field extraction/write processes can be performed completely in parallel, it is possible to execute the packet processing at extremely high speed.

In the case of the shared program collectively describing unique procedures associated with respective instructions ((2)), since the circuit components, such as a program counter, can be shared to reduce the quantity of the components, it is also possible to reduce the circuit scale.

In the case of the shared program describing unique procedures associated with a composite instruction ((3)), partly since the arithmetic operation and field extraction/write process can be performed in parallel and partly since the circuit components can be shared to reduce the quantity of the components, it is possible to realize a high-speed packet processor having an reduced size in the circuit scale.

As a still further preferable feature, the shared composite circuit, which is dedicated to field extracting and field writing, shares a component of the general-purpose arithmetic operator, it can operate in accordance with a shared program collectively describing unique procedures associated with the respective dedicated instructions.

With this shared composite circuit, it is possible to further reduce the size of the packet processor can be further reduced, and at the same time, to increase the rate of the packet processing.

Other objects and further features of the present invention will be apparent from the following detailed description when read in conjunction with the accompanying drawings.

BRIEF DESCRIPTION OF THE DRAWINGS

FIG. 8 is an example of a list showing a set of instructions (kinds of instructions) which are applied to the packet processor;

FIG. 9 is a diagram schematically showing an instruction sequence of a packet process (TTL subtraction process) of the packet processor using the set of instructions of FIG. 8;

FIG. 12 is a diagram schematically showing an instruction sequence of packet processing (an IP address extracting/retrieving process) of the packet processor of FIG. 11 using the set of instructions of FIG. 8;

FIG. 15 is a schematic diagram showing an instruction sequence of a packet process (TTL subtraction process) of the packet processor of FIG. 14 using the set of instructions of FIG. 8;

FIG. 17 is a diagram schematically showing an instruction sequence of packet process (TTL subtraction process) of the packet processor of FIG. 16 using the set of instructions of FIG. 8;

DESCRIPTION OF THE PREFERRED EMBODIMENTS

Various preferred embodiments of the present invention will now be described with reference to the accompanying drawings.

Figure 1:
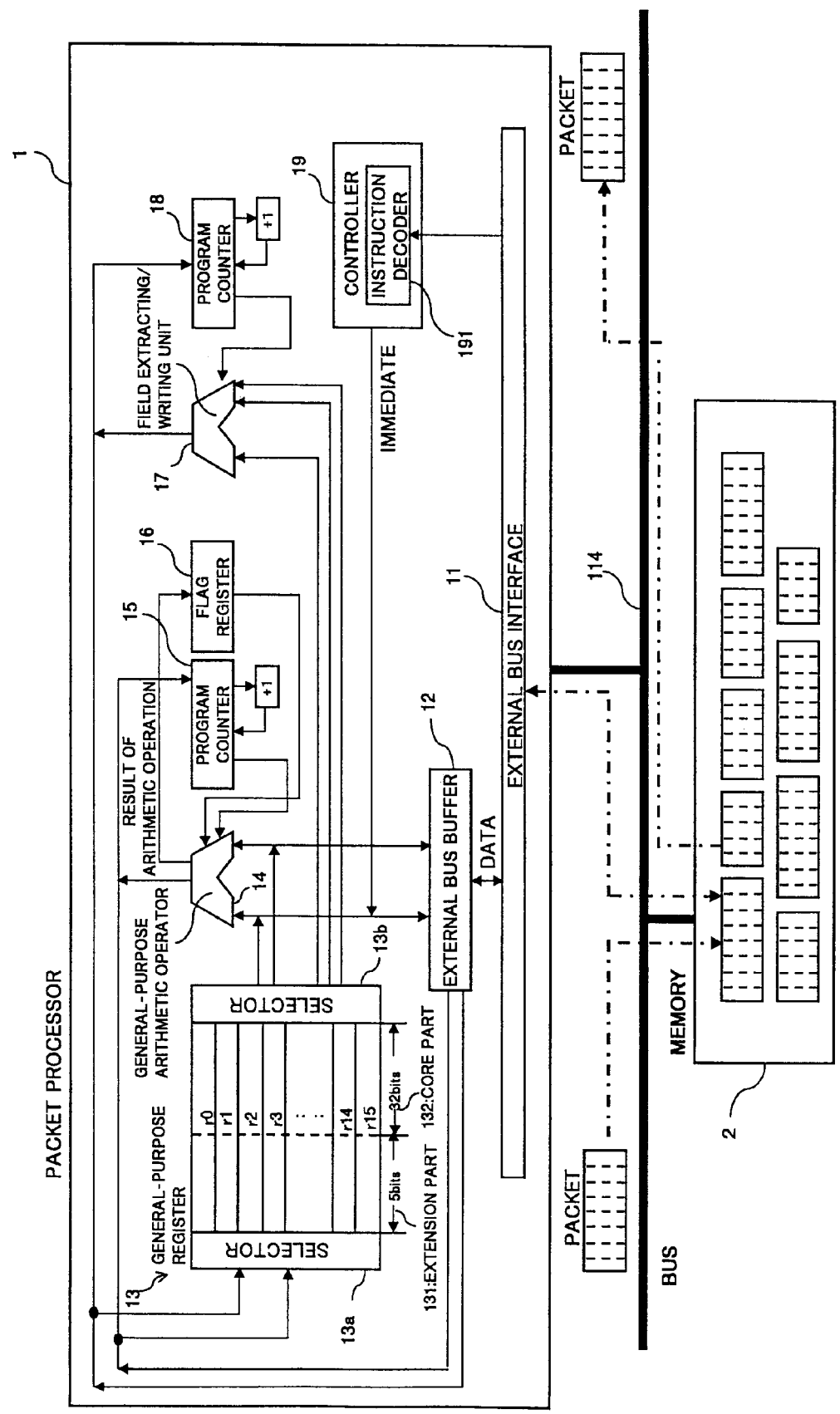
FIG. 1 is a block diagram schematically showing a packet processor according to a first embodiment of the present invention.
Figure 18:
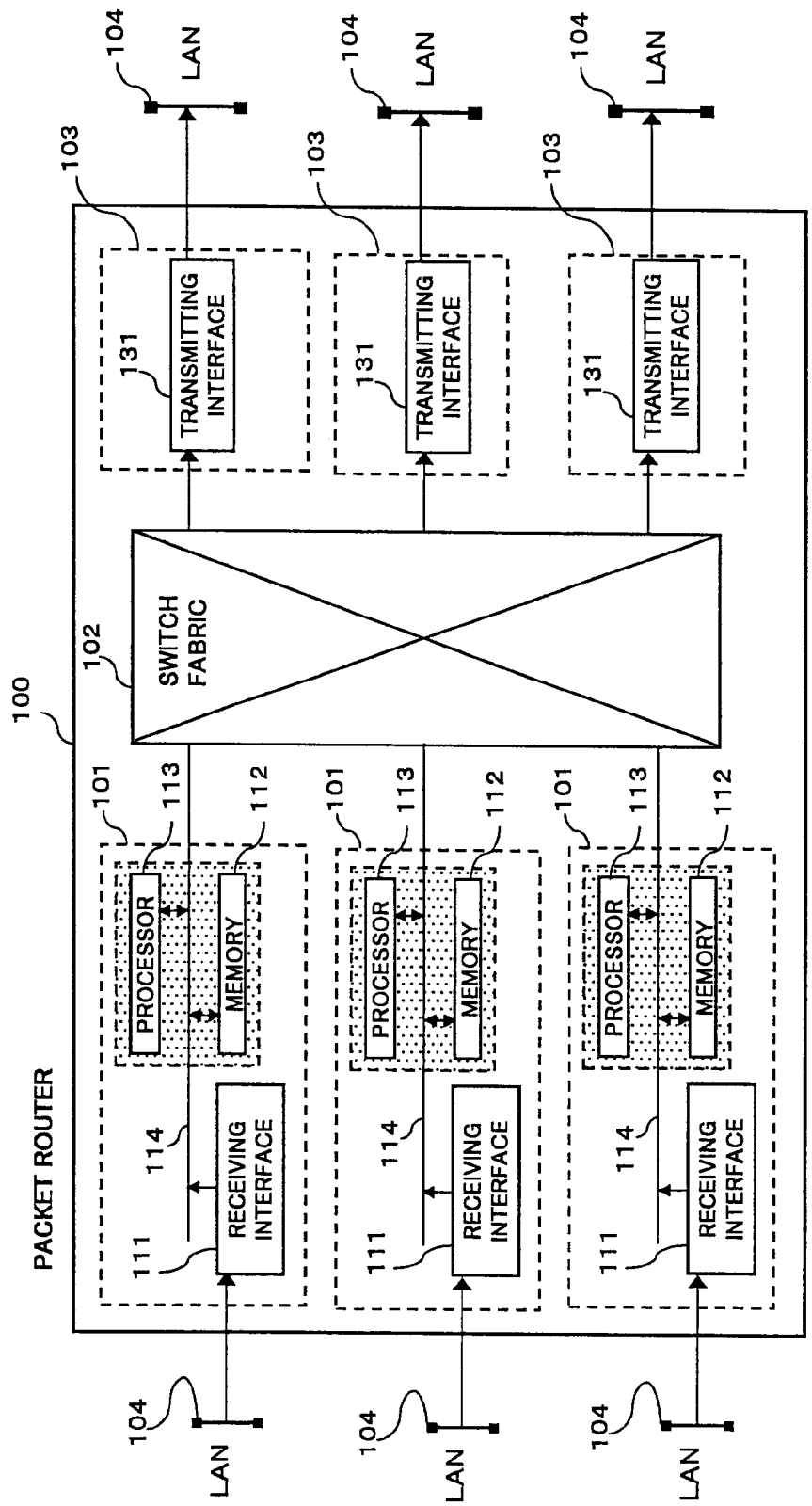
FIG. 18 is a block diagram schematically showing one conventional packet router.

(A) First Embodiment:

FIG. 1 is a block diagram schematically showing a packet processor according to a first embodiment of the present invention. The packet processor 1 is built in a non-illustrated packet receiving/processing unit (101) of a non-illustrated packet router (100), which are described in connection with the conventional art (FIG. 18). The packet processor 1 executes a predetermined packet process, such as calculating a header check sum and updating an address of a packet received via an LAN 104. The packet processor 1 is equipped with an external bus interface 11, an external bus buffer 12, a general-purpose register 13, a general-purpose arithmetic operator 14, a program counter 15, a flag register 16, a field extracting/writing unit 17, a program counter 18, and a controller 19. The general-purpose register 13 is composed of 16 registers indicated by r0 through r15 in the illustrated example, and two selectors 13a, 13b, for changing over an object register, which are arranged on the both sides of the general-purpose register 13. In FIG. 1, reference number 2 designates a memory for temporarily storing received packets to be packet-processed in future; 114, a bus (data transfer path) connecting the packet processor 1 and the memory 2.

Figure 19:
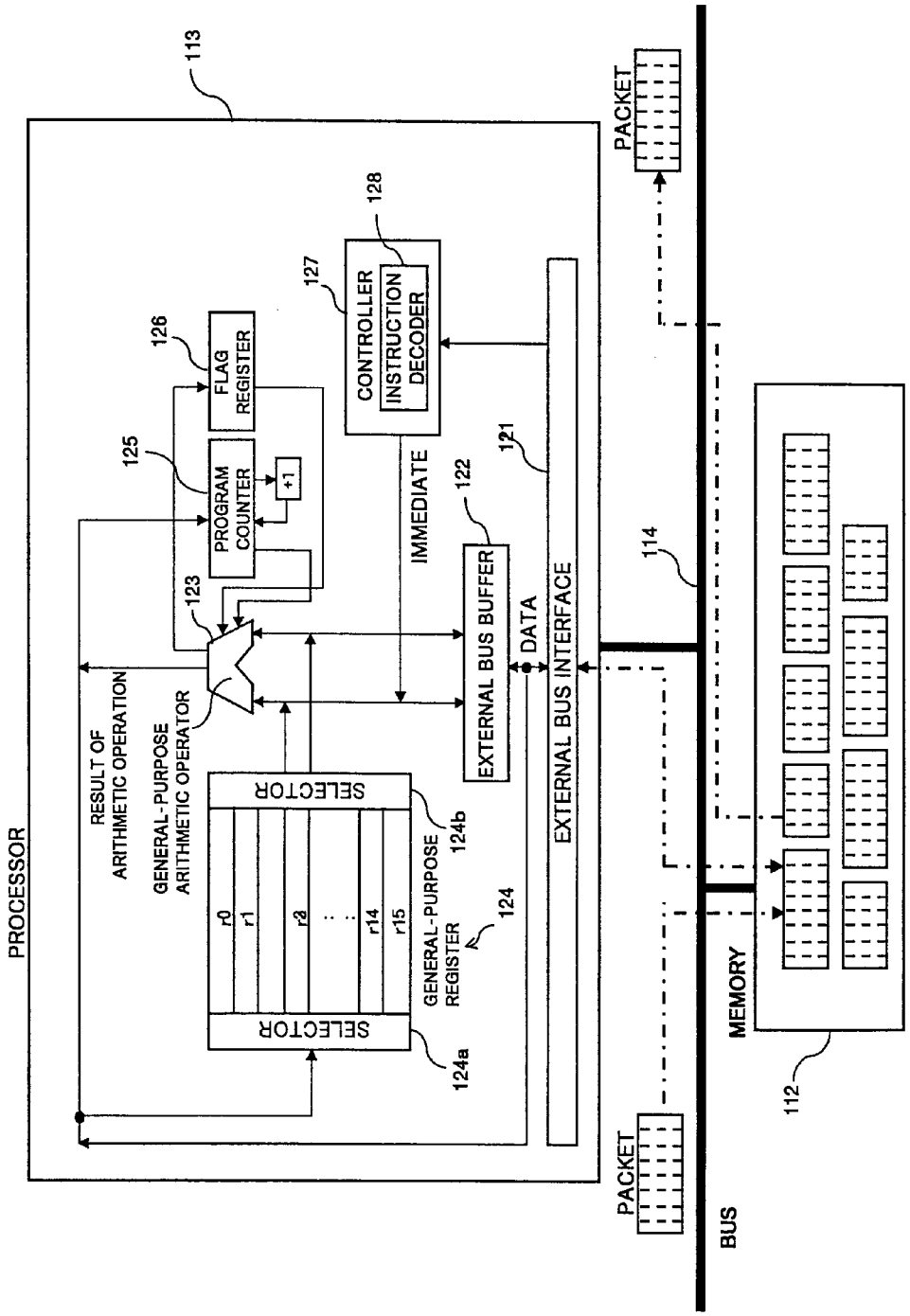
FIG. 19 is a block diagram focusing on a memory and a packet processor of the packet router of FIG. 18.

The external bus interface 11, the external bus buffer 12, the general-purpose arithmetic operator 14, the program counter 15 and the flag register 16 are parts corresponding to those in connection with the conventional art (FIG. 19), so any repetitious description is omitted here but the other components will be explained in detail.

The general-purpose register 13 (r0 through r15) is basically used for storing packet data. In the illustrated embodiment, assuming that a word, which is basic data to be processed in the packet processor 1, has an architecture of 32 bits, each register (r0 through r15) of the general-purpose register 13 has an architecture of 37 bits, which has extended by 5 bits from 32 bits of the minimum requirement. Such 37-bit-register is in the form of a composite register of a core part 132 of 32 bits and an extension part 131 of 5 bits. The extension part 131 is only used upon executing field-extracting/writing instructions. When other instructions are executed, only the core part 132 is used as a 32-bit register.

As described below, field-extraction/write instruction of the illustrated embodiment is expressed in the form of a composite instruction of a field-extraction/write bit pattern, which represents a bit position of a particular field in the general-purpose register 13, and a bit rotation extent (hereinafter also called a rotation extent) of the particular field in the general-purpose register 13. The rotation extent is retained in the extension part 131 of the general-purpose register 13, and the field-extraction/write bit pattern is retained in the core part 132.

The wording "rotation of a field" means that a designated rotation extent (bit) in the most-significant-bit (MSB) side of a particular field is shifted to the last-significant-bit (LSB) side keeping the bit order, and the rest bits of the LSB side, which have not been rotated to the LSB side, are also shifted to the MSB side (leftward) by the same extent of rotation. The "rotation of a field" also means that a designated rotation extent (bit) in the LSB side of a particular field is shifted to the MSB side keeping the bit order, and the rest bits of the MSB side, which have not been rotated to the MSB side, are also shifted to the LSB side (rightward) by the same extent of rotation. The former rotation is called "leftward rotation", and the latter rotation is called "rightward rotation".

The general-purpose register 13 also functions as an instruction retaining unit retaining a composite instruction of rotation extent of a particular field and a field-extraction/write bit pattern. Thus, the general-purpose register 13 is a composite register retainable both such composite instructions and packet data.

With such a general-purpose register 13, since a rotation extent of a particular field and a field-extraction/write bit pattern can be designated in one and the same register, it is possible to make the instruction length shorter than the case when a rotation extent of a particular field and a field-extraction/write bit pattern have to be assigned to the different registers by the instruction. Therefore, it is possible to save the storage (of the memory 2 if instructions are stored in the memory 2) for instructions. Particularly, when the basic instruction architecture is a fixed length instruction, which is all the bit lengths of instructions are identical, it is important for the length of instruction to be short in view of the coding efficiency. The instruction architecture of the packet processor 1 is a fixed length instruction in the illustrated embodiment as described below in detail.

The field extracting/writing unit 17 (a dedicated circuit for field-extraction and field-write) functions as a dedicated field extracting circuit extracts information about a particular field of the packet data, such as an IP address or a TTL (Time To Live) as an object field for the arithmetic operation by the general-purpose arithmetic operator 14, from the general-purpose register in accordance with an instruction sequence of a field extraction/write instruction from the controller 19. The field extracting/writing unit 17 also functions as a dedicated field writing circuit, which writes a result of arithmetic operation by the general-purpose operator 14 into the general-purpose register 13 as updated information of the particular field in accordance with an instruction sequence of a field extraction/write instruction from the controller 19. The field extracting/writing unit 17 serves as both the dedicated field extracting circuit and the dedicated field writing circuit. The field extracting/writing unit 17 realizes these two functions by performing logical arithmetic operations (taking a logical product (AND), taking a logical sum (OR), taking a logical negative (NOT), rotating, etc.) using the rotation extent and the field-extraction/write bit pattern.

Figure 5:
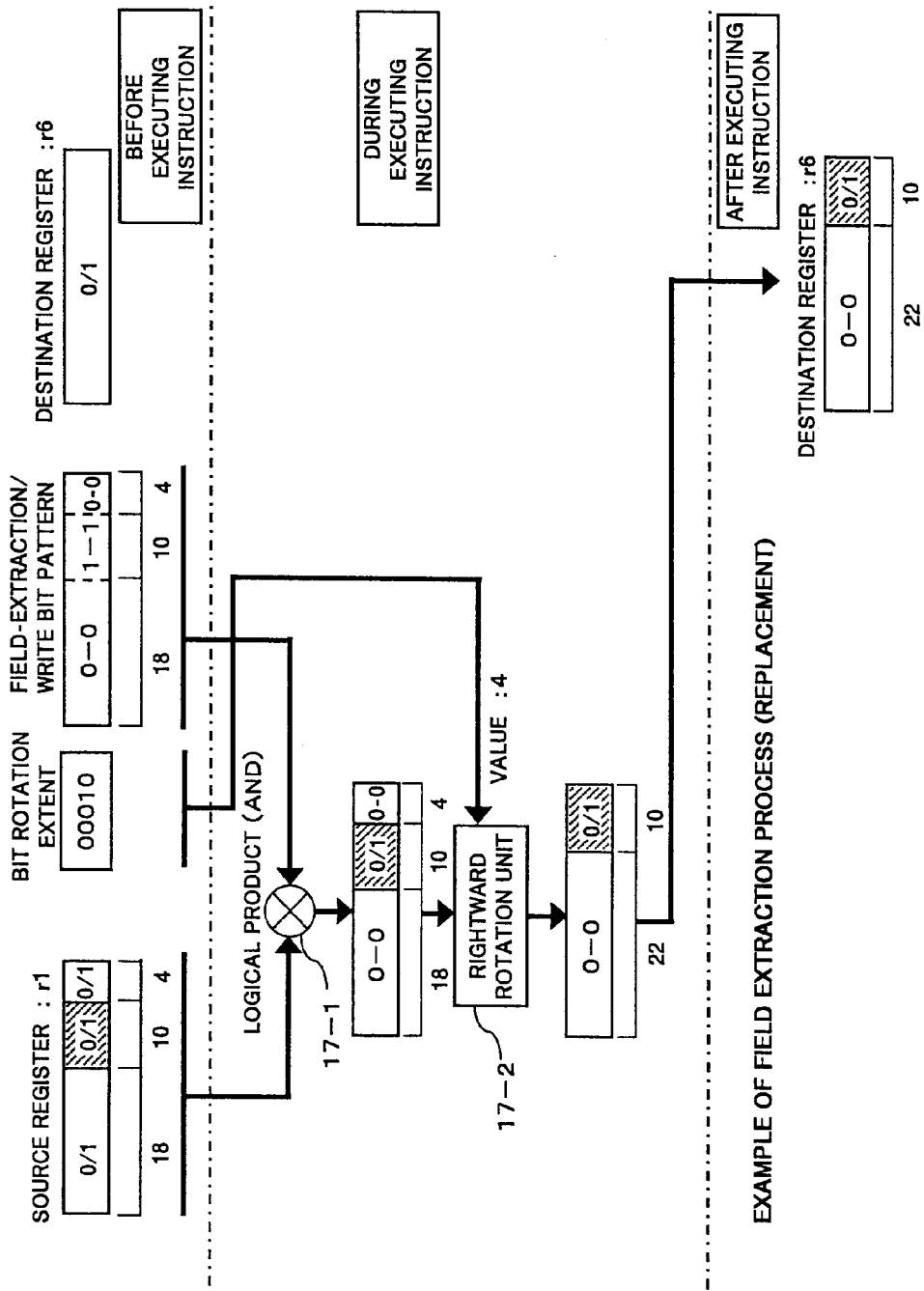
FIG. 5 is a diagram showing an example of the field extraction process (replacement) of the field extracting/writing unit of the packet processor.
Figure 6:
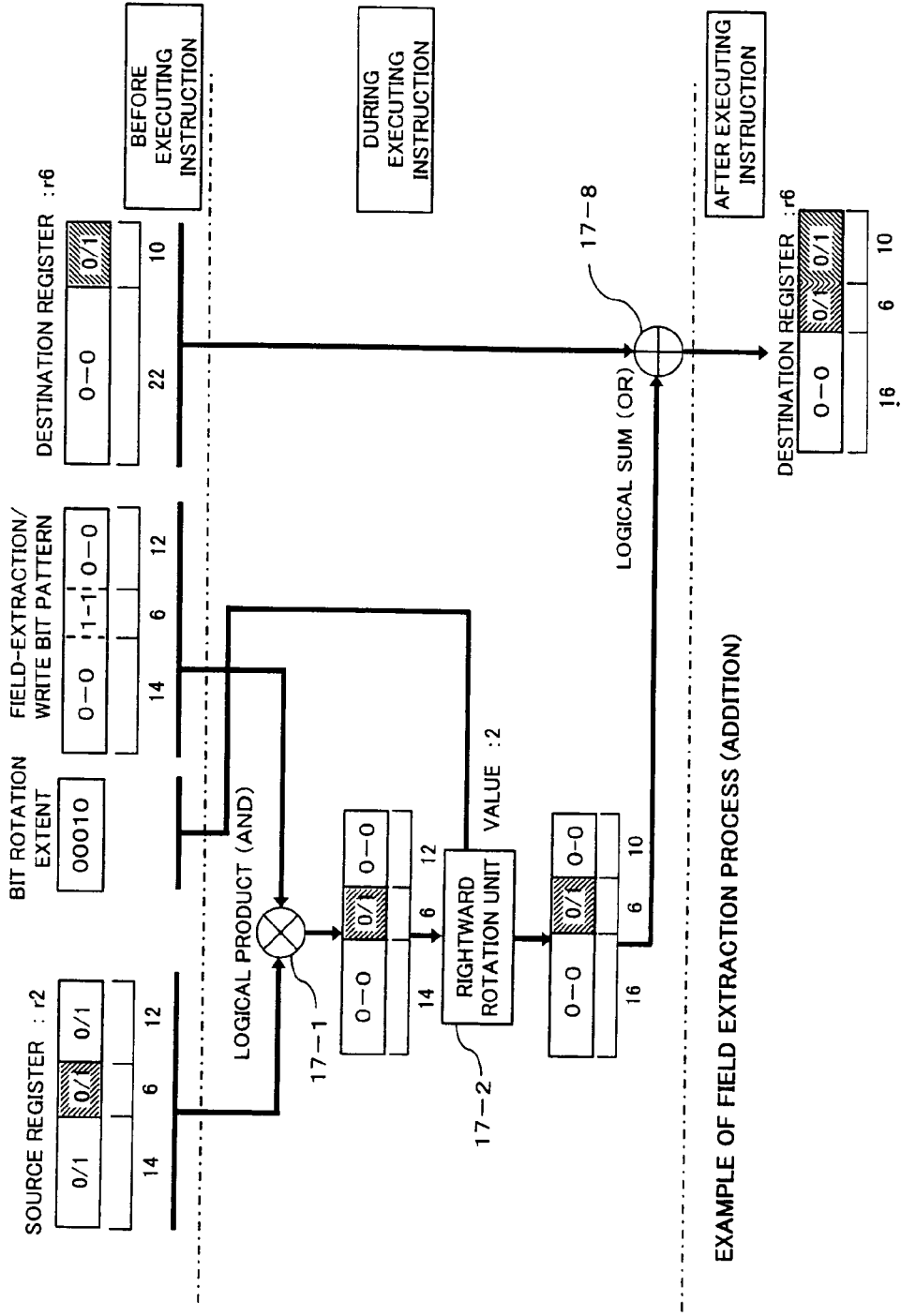
FIG. 6 is a diagram similar to FIG. 5, but showing an example of the field extraction process (addition) of a field extracting/writing unit of the packet processor.
Figure 7:
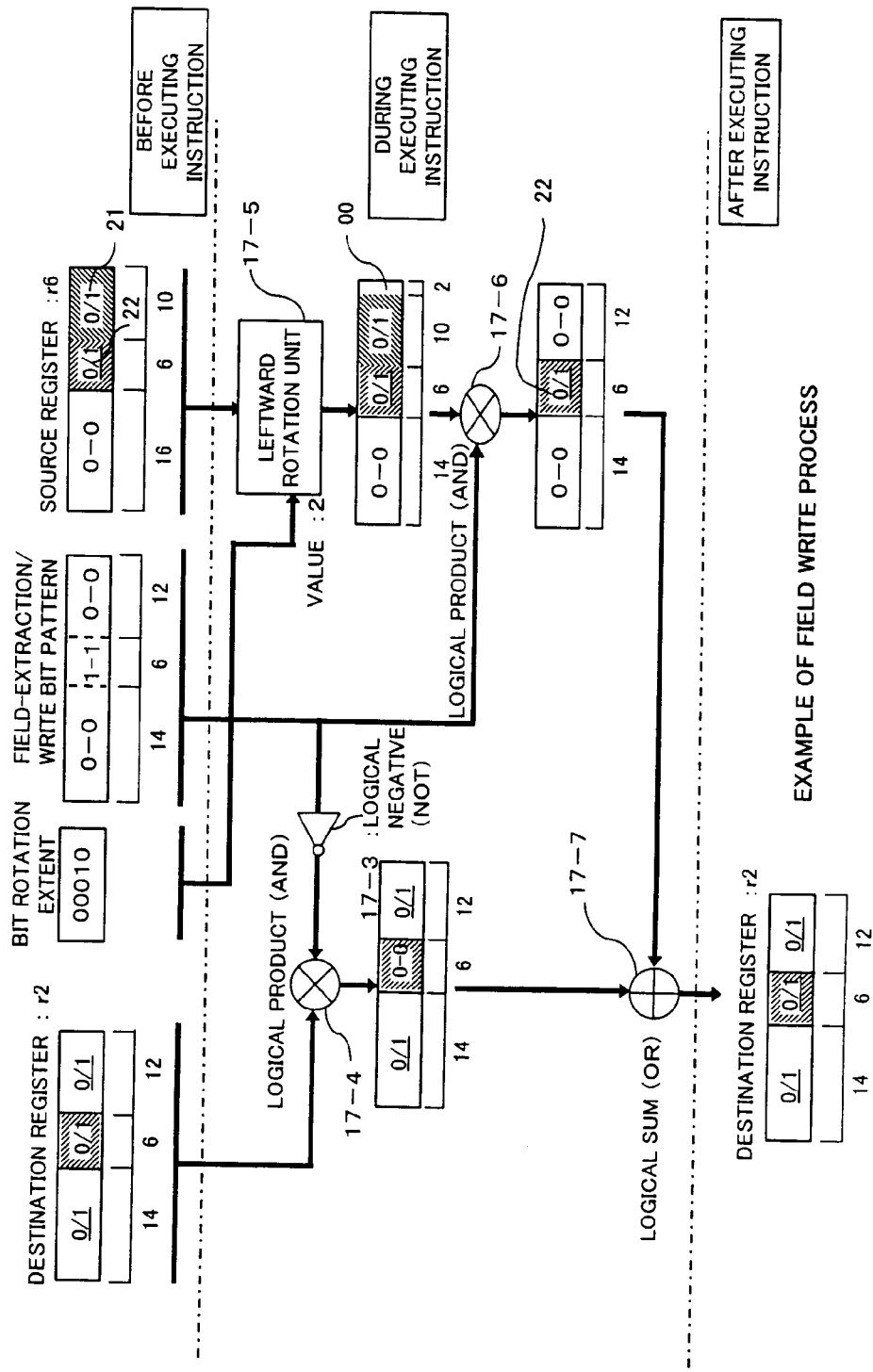
FIG. 7 is a diagram similar to FIG. 5, but showing an example of the field write process of a field extracting/writing unit of the packet processor.

To accomplish such functions, logical-product (AND) circuits 17-1, 17-4, 17-6, logical-sum (OR) circuits 17-7, 17-8, a logical-negative NOT circuit 17-3, a rightward rotation unit 17-2, and a leftward rotation unit 17-5 are built in the field extracting/writing unit 17 as shown FIGS. 5 through 7.

The field extracting/writing unit 17 is not composed of circuits dedicated to particular fields of arithmetic object such as an IP address (SA, DA) field and a TTL field. But the field extracting/writing unit 17 enables to flexibly extract a particular field and write the extracted field into the field in accordance with an instruction described by the designer of the apparatus. Thus the field extracting/writing unit 17 is a shared arithmetic operator for individual fields of arithmetic object. The program for the field extraction/write is previously stored in the memory 2 or a non-illustrated external memory.

The program counter 18 retains the position of the currently-executed instruction in the program. The program counter 18, like the program counter 15 for the general-purpose arithmetic operator 14, increments the counts one by one in response to the execution of individual successive instructions. The controller 19 sequentially reads the program (instruction codes) and then decodes the instruction codes in the instruction decoder 191 so as to produce instructions that will be given to the general-purpose arithmetic operator 14 and the field extracting/writing unit 17.

The mode of operation of the packet processor 1 of the first embodiment will now be described with reference to FIGS. 2 through 7. In FIGS. 2 through 7, "0-0" represents a bit string of straight 0s; "1-1", a bit string of straight 1s; "0/1", a bit string whose each bit takes either one of 1 and 0.

First of all, the field extracting/writing unit 17 extracts only a particular field of an arbitrary length in an arbitrary position as an object field of an arithmetic operation of the general-purpose arithmetic operator 14 from the source register ri (i is an integer between 0 and 15) among the packet data retained in the general-purpose register 13 in accordance with an instruction from the controller 19 (instruction decoder 191). The one or more fields, except for the object field, in the source register ri are not extracted in this process. Then the field extracting/writing unit 17 writes the extracted object field into a register rj (j is an integer of 0 through 15 and is not equal to i) designated by the instruction (destination register).

Meanwhile, the field extracting/writing unit 17 writes the particular field (result of the arithmetic operation) updated by an arithmetic operation of the general-purpose arithmetic operator 14 into the source register ri, in which the other data except for the particular field and the particular field prior to being updated coexist, so as not to affect on (overwrite) the other data. Namely, the field extracting/writing unit 17 performs a field write process in such a manner that the object field for the arithmetic operation and the other fields except for the object field are updated in one and the same general-purpose register 13.

Extracting/writing an arbitrary particular field of the general-purpose register 13 by the field extracting/writing unit 17 requires an instruction having information about the length and the position of the particular field in the source register, and the position of a register (destination register ri) to which position the extracted particular field is going to be written. In the illustrated example, the composite instruction of a field-extraction-and-writing bit pattern and a rotation extent is used for instructing an extracting/writing process with respect to the particular field to the packet processor 1.

Figure 20:
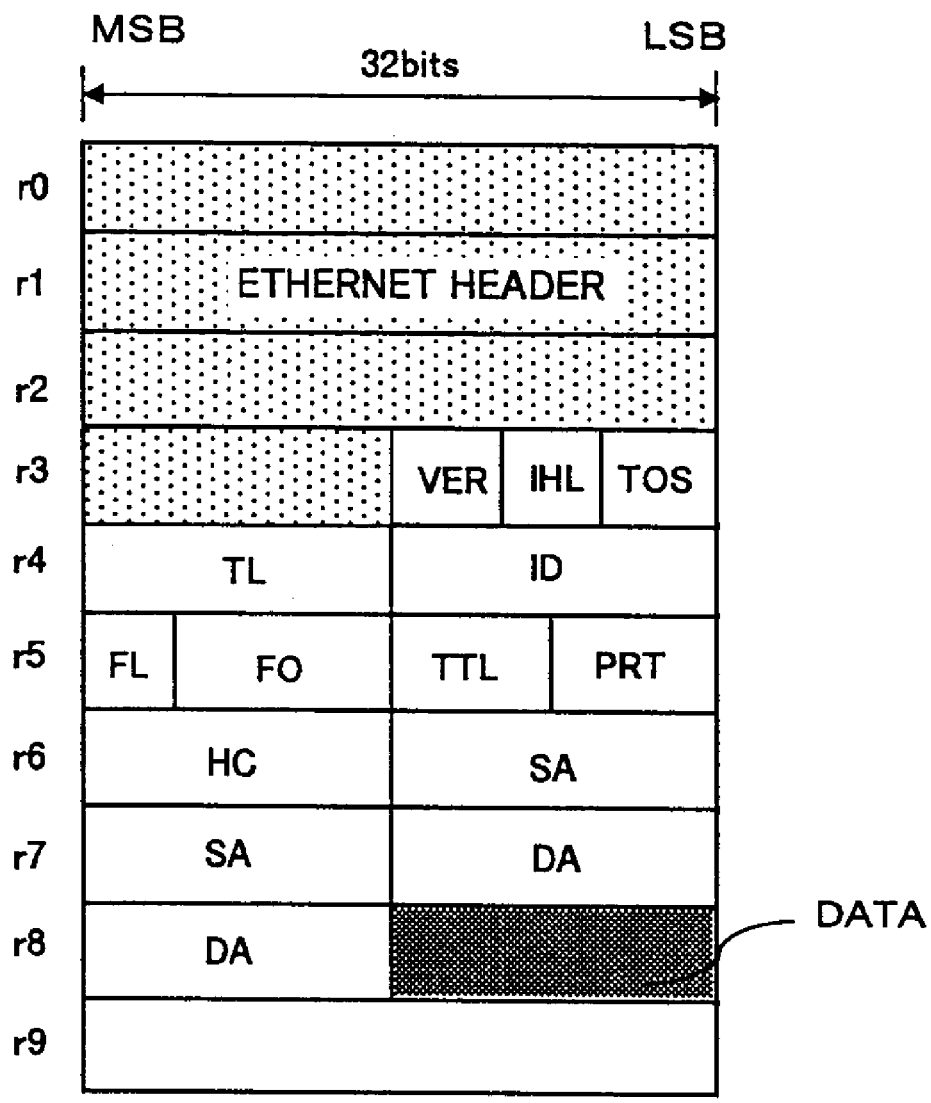
FIG. 20 is a diagram schematically showing an example of a conventional packet format (Ethernet format).

At that time, the object field to be extracted is retained in a single register ri, such as TTL of FIG. 20, or is retained separately in plural registers ri, such as an IP address of FIG. 20. In the latter case, though the object field is retained separately in the successive registers ri, it should be processed as a single set and hence must be written into a single destination register ri.

Figure 2:
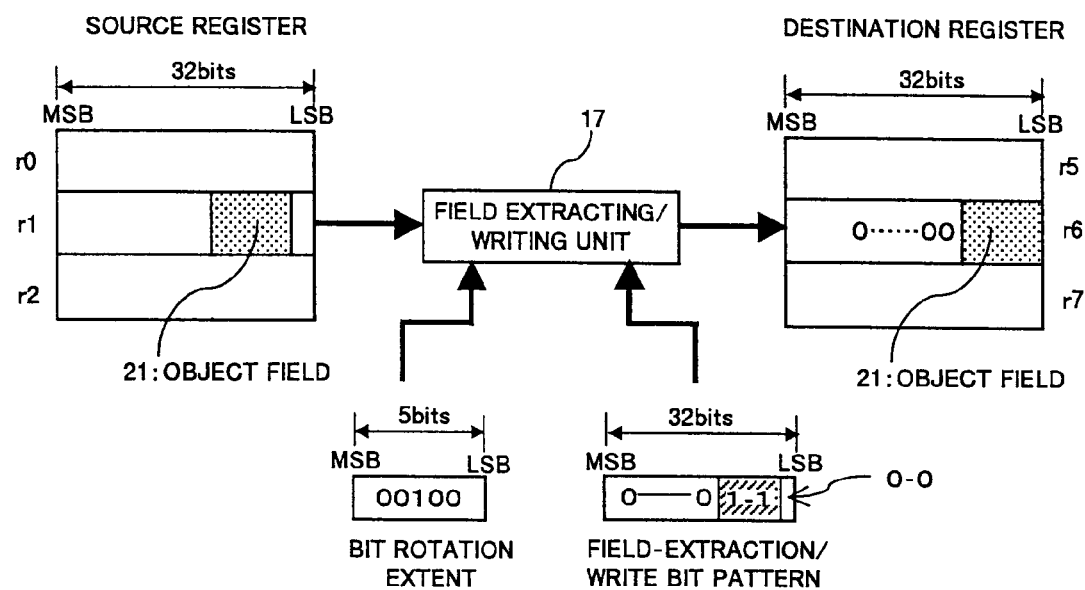
FIG. 2 is a diagram schematically showing a field extraction process (replacement) of a filed extracting/writing unit of the packet processor of FIG.
Figure 3:
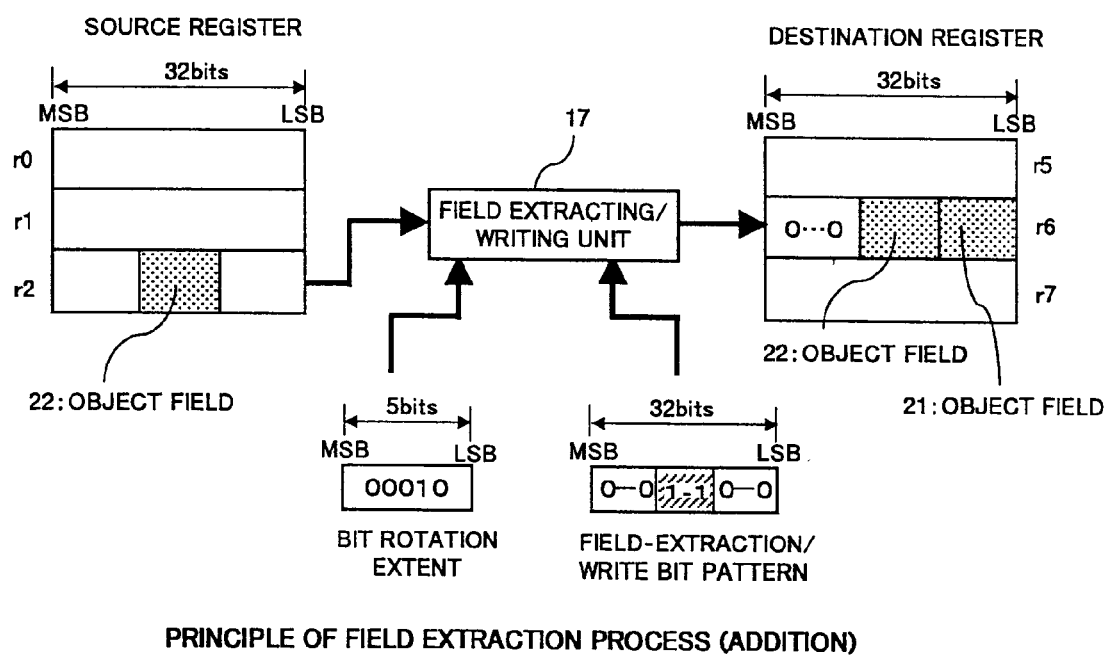
FIG. 3 is a diagram similar to FIG. 2, but showing a field extraction process (addition) of the field extracting/writing unit of the packet processor.

There are two kinds of field extraction processes. For one, as shown in FIG. 2, the information about the destination register ri (register r6 in FIG. 2) is updated with information about an object field 21 in the source register (register r1 in FIG. 2), and the bits other than the object field are updated to "0" (hereinafter called replacement). For the other, as shown in FIG. 3, information of the extracted object field 21 in the destination register r6 is not updated, and the information of another object field 22 in the source register, which is to be processed together with the object field 21, is extracted and then added into the destination register r6 (hereinafter called addition).

Therefore, the field extracting/writing unit 17 has to perform the above-mentioned two extraction processes. With dedicated instructions for the two extracting processes in the illustrated embodiment, the field extracting/writing unit 17 detects a kind of an extraction process, consulting with an instruction and then performs the corresponding operation (extraction process). When the received instruction represents the execution process of replacement, the field extracting/writing unit 17 reads data of register r1 including the object field 21, the field-extraction-and-field-write bit pattern, which represents a bit position (region) of the object field expressed by the bit of "1", and a rotation extent of 5 bits (values 0 through 31, value is 4 in FIG. 2) from the register ri (i is not equal to "1"). Then, the field extracting/writing unit 17 extracts the object field 21 from register r1 based on the field-extraction-and-field-write bit pattern.

Specifically, the field extracting/writing unit 17 takes a logical product (AND) of information of the register r1 including the object field 21 (of 10 bits) and a field-extraction-and-field-write bit pattern (of 10 bits), which represents a bit position of the object field in the register r1, by the bit of "1" in the AND circuit 17-1 as shown in FIG. 5. As a result, information about the other fields in the register r1 except for the object field 21 is updated to "0" and then the object field 21 is extracted.

The field extracting/writing unit 17 rotates the extracted object field 21 with the rotation extent designated by the instruction retained in the extension part 131 of the register ri (i is not equal to "1") (value of 4) toward the LSB side (rightward) using the rightward rotation unit 17-2 so as to shift the position of the object field 21. Then the object field 21 is written into the destination register r6, which is designated by the instruction.

In the mean time, when the received instruction represents the extraction process of addition, the field extracting/writing unit 17 extracts the object field 22, as shown in FIG. 6, and shifts the position of the object field 22 in the same manner as described in the case of the replacement. After that the field extracting/writing unit 17 takes in the OR circuit 17-8 a logical sum (OR) of information of the output of the rightward rotation unit 17-2 including the object field 22 and the information of the destination register r6 including the extracted object field 21. Since the result of the OR operation is written into the destination register r6, the object field 22 is added to the destination register r6.

The values of the bit position to retain the object field 22 in the destination register r6, which already retains the extracted object field 21, are "0" as shown in FIG. 6 when extracting the object field 22 (in the AND circuit 17-1). With such bit string of the destination register r6, the object field 22 can be exactly added to the desired position of the destination register r6 as long as the bit position of the extracted object field 21 does not overlap that of the object field 22.

Non-overlapping of the bit positions of the plural object field in the destination register r6 can be realized by an instruction for doing so, which is designed by the instruction designer. In FIGS. 5 and 6, although the values of the registers in each of the successive processes are described for reference, the entire extraction process can be realized using combination circuits without preparing a storage circuit for temporarily storing the values in the individual processes. As a result, the field extracting/writing unit 17 in the packet processor 1 can perform the extraction processes in the manner described above at high speed.

Figure 4:
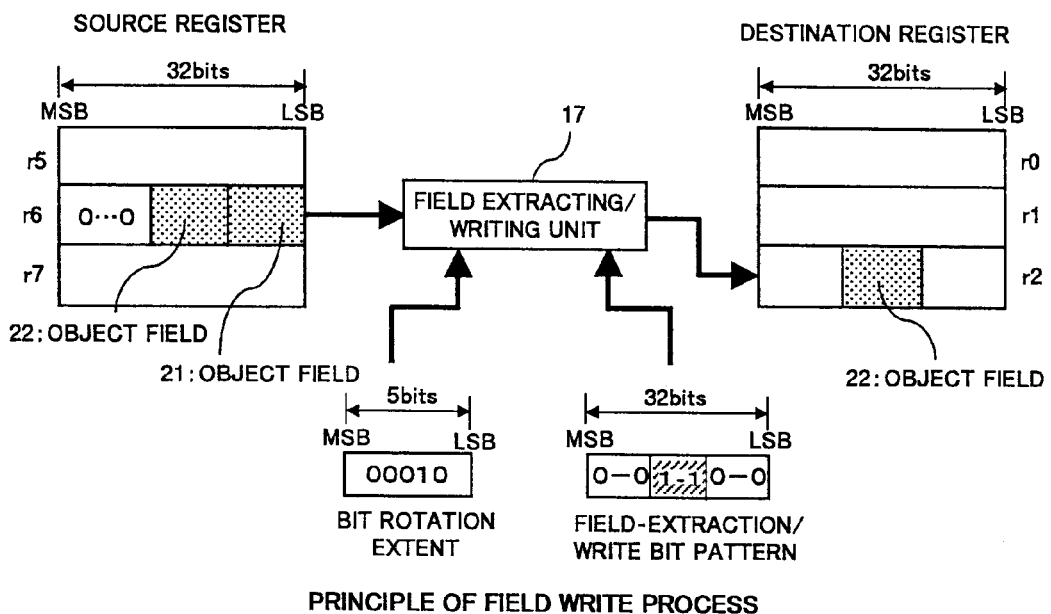
FIG. 4 is a diagram similar to FIG. 2, but showing a field write process of the field extracting/writing unit of the packet processor.

When performing a field write process, the field extracting/writing unit 17 reads the data of register r6 including the object field 22 (21), a field-extraction-and-field-write bit pattern, and a rotation extent, which are designated by an instruction as shown in FIG. 4. Then the field extracting/writing unit 17 writes the updated information of the object field 22 (21) in the register r6 into register r2 (r1) so as not to overwrite the other data except for the field 22 (21) based on the field-extraction-and-field-write bit pattern and the rotation extent. At that time, the register r2 (r1) is a destination register, and the register r6 is a source register reversely of the field extraction process.

The field extracting/writing unit 17 refers to the register r2 (r1), from which the object field 22 (21) had been extracted, so as to read the field-extraction-and-field-write bit pattern and the rotation extent used upon extracting the object field 22 (21). Then the field extracting/writing unit 17 writes the object field 22 (21) into the bit position, where the object field 22 (21) had located before extracted, in the source register r2 (r1) based on the field-extraction-and-field-write bit pattern and the rotation extent.

As one example shown in FIG. 7, the field extracting/writing unit 17 takes a logical product (AND) of information of the destination register r2, which includes a field not updated and also the result of a NOT operation of the NOT circuit 17-3 in the AND circuit 17-4, and thereby changes the field of 6 bits, which is an object to be updated, into "0"s.

Meanwhile, the field extracting/writing unit 17 rotates the bit position of the source register r6 retains the object field 22 toward the MSB (leftward), reversely of the above-mentioned field extraction process, using the leftward rotation unit 17-5 so as to shift the bit position of the source register r6 to the bit position of the destination register r2 in the execution of the instruction. As a result, the information of the source register r6 is shifted by two bits toward the MSB. The field extracting/writing unit 17 takes a logical product (AND) of the shifted result and the field-extraction-and-field-write bit pattern in the AND circuit 17-6 to extract only the object field 22.

Subsequently, the field extracting/writing unit 17 takes a logical sum (OR) of the above-mentioned extracted object field 22 and the information of the destination register r2, in which bits in fields other than the object field to be updated are "0", in the OR circuit 17-7 to write the output of the OR circuit 17-7 into the destination register r2. As a result, only information of the field, which is an object to be updated and is obtained in the AND circuit 17-4 in the destination register r2, is updated to information of the source register r6 (information of the object field 22).

The interim values of the registers during the individual step of the processing procedure are shown also in FIG. 7 for quick reference. In the procedure of FIG. 7, the entire write process can be executed using the combination circuits without preparing a storage circuit for temporarily storing the values in each step. As a result, the field extracting/writing unit 17 in the packet processor 1 can perform write processes in the manner described above at high speed.

Figure 10:
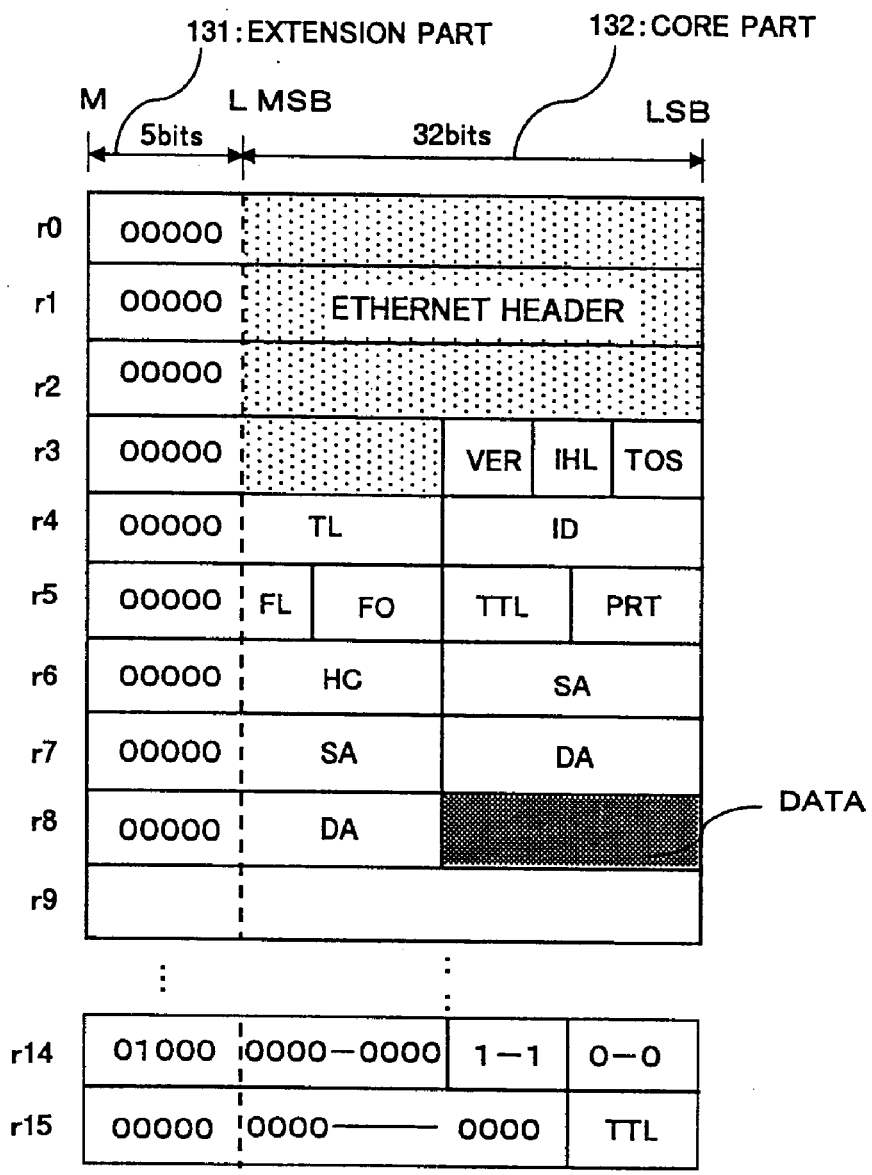
FIG. 10 is a diagram schematically showing data contents of a general-purpose register of the packet processor of FIG. 1 when the packet processor is operating.

A process of executing a TTL subtraction process as one example of a packet process in the packet processor 1 of the illustrated embodiment will now be describes with reference to FIGS. 8 through 10. The value of the TTL field in the IP header is decremented in the TTL subtraction process. Specifically, the value of the TTL field is decremented by one at each time when a packet passes one packet router (100). When the TTL value of a packet becomes "0", the packet is abandoned so as not to be ever routed due to a wrong network configuration or any other cause.

FIG. 8 is a list showing a set of instructions (kinds of instructions) which are applied to the packet processor; FIG. 9 is a diagram schematically showing an instruction sequence of packet processing (TTL subtraction process) of the packet processor using the set of instructions of FIG. 8; FIG. 10 is a diagram schematically showing data contents of the general-purpose register 13 while the packet processor 1 is operating.

First of all, the instruction architecture of the packet processor 1 of the illustrated embodiment will be described.

The instruction format of the illustrated embodiment is a combination of an instruction mnemonic (FIG. 8), such as "SUB" (subtraction instruction) or "MOVE" (data-transfer instruction), and a condition code such as AL (described below) as shown in FIG. 9. The instruction mnemonic comes after a condition code. When the result of an arithmetic operation immediately before the instruction satisfies a condition code, the packet processor 1 executes the corresponding instruction.

When the result of an arithmetic operation executed by the packet processor 1 immediately before the current instruction is "0" and the condition code of the current instruction is ZE (Zero; equal to "0"), the packet processor 1 executes the current instruction. Otherwise, when the condition code of the current instruction is other than ZE, the packet processor consumes only the clock cycles without executing the current instruction.

The other condition codes are "NV" (Never; never execute), "AL" (Always; always execute), "NZ" (Not Zero; not equal to "0"), "GT" (Greater Than; greater than "0"), "LT" (Less Than; less than "0"), "LE" (Less Equal; less than and equal to "0"), "CS" (Carry Set) "CC" (Carry Clear), etc. Flags, which evaluate whether the arithmetic result immediately before the corresponding instruction satisfies the condition codes, and the number of the flags sufficient to evaluate these plural condition codes are stored in the flag register 16. The flag register 16 also stores a carry flag which keeps carrying of the arithmetic operation.

The basic format of an instruction of an arithmetic operation is expressed as follows: If the format has three operands, it is expressed by "condition code, instruction mnemonic, destination operand, source operand #1, source operand #2"; and if the format has two operands, it is expressed by "condition code, instruction mnemonic, destination operand, source operand #1". An immediate, such as "0", which is except for a register number, to be put into an instruction is expressed by "$0".

Having the above-mentioned instruction format as a base, in the illustrated embodiment, one kind of a field extraction (replacement) process, is expressed by "condition code, LDPTR, destination register, source register #1, source register #2"; the instruction of an addition, while the other kind of a field extraction process is expressed by "condition code, LDPTO, destination register, source register #1, source register #2". Further, the instruction of a field write is expressed by "condition code, STPT, destination register, source register #1, source register #2".

When an instruction designer describes a field extraction instruction, "destination register" designates a register to store an extracted object field, "source register #1" designates a register stores an object field to be extracted, and "source register #2" designates a register to store the rotation extent and the field-extraction-and-field-write bit pattern.

To describe a field write instruction, "destination register" designates a register to store an object field to be updated, and "source register #2" designates a register to store the rotation extent and the field-extraction-and-field-write bit pattern. The packet processor 1 (the field extracting/writing unit 17) refers to such a field extraction instruction and a field write instruction, and performs a field extraction process and a field write process.

An instruction sequence to be read by the packet processor 1 from the memory 2 or the like is described by a designer of the packet router and is stored into the memory 2 or the like. The memory 2 or the like transmits the instruction sequence to the packet processor 1 when the power switch of the packet router is turned on. Subsequently, in the packet processor 1, the instruction decoder 191 decodes each component of the instruction sequence, and then the controller 19 retains the decoded results. The packet processor 1 performs each instruction of FIG. 8 always at a predetermined single clock cycle without consuming clock cycles during packet processing.

The practical TTL subtraction process of the packet processor 1, which has the above-mentioned instruction architecture, will now be described.

The packet processor 1 transfers the header of a packet from the memory 2 to the general-purpose register 13 (r0 through r8) using a data-transfer instruction from the controller 19 as shown in FIG. 10 before the execution of the instruction sequence of FIG. 9. Concurrently, the rotation extent and the field-extraction-and-field-write bit pattern used for extracting the TTL field are stored into the register r14 of the general-purpose register 13. These storing operations are executed by sending a value (an immediate), which are put into the data-transfer instruction or other instructions by an instruction designer of the general-purpose register 13, to the packet processor 1.

In the packet processor 1, the field extracting/writing unit 17 operates in accordance with an instruction of the execution cycle "m+2" in the instruction sequence of the field extracting/writing of FIG. 9 (a field extraction instruction "AL LDPTR r15 r5 r14"). The execution cycle is counted in the program counter 18. According to the field extraction instruction, the field extracting/writing unit 17 extracts the TTL field from the register r5 (the source register) to temporarily store into the register r15 (the destination register).

Since the field extraction instruction is an instruction of a replacement (LDPTR), the field extracting/writing unit 17 replaces the bits of the MSB side of the object field in the register 15 with "0" as shown in FIG. 10, in the same manner as in the field extraction process shown in FIG. 5. At that time, the general-purpose arithmetic operator 14 is executing the other operation #1 as shown in FIG. 9. Then the general-purpose operator 14 subtracts the value of the TTL field, which the field extracting/writing unit 17 has been extracted, by "1" in accordance with the instruction of the execution cycle "n+3" of the instruction sequence of the general-purpose arithmetic operator 14 (a subtraction instruction "AL SUB r15 r15 $1"). The execution cycle is counted in the program counter 15.

After the updating process, the field extracting/writing unit 17 performs a field write process of the TTL field in the manner described as the mode of operation of FIG. 7 in accordance with the instruction of the execution cycle "m+4" (field write instruction "AL STPT r5 r15 r14"). Performing the field write process updates only information of the TTL field in the register r5. At the same time, the general-purpose arithmetic operator 14 performs the other operation #2. Being not described the instructions of the other operations #1, #2 in FIG. 9, they represent the other operations being directly related to the TTL subtraction process and being executed.

Since the packet processor 1 is equipped with the general-purpose arithmetic operator 14 and the field extracting/writing unit 17 in the form of separate circuits, which have the dedicated program counters 15, 18 and the dedicated data paths, the packet processor 1 can perform a field extraction/write process and other operation in parallel in accordance with two different instructions separately describing unique procedures associated with the respective dedicated instructions of the general-purpose arithmetic operator 14 and the field extracting/writing unit 17 described by an instruction designer.

Performing a field extraction/write process and other operation in parallel occasionally causes a contention when writing into the general-purpose register 13. As one solution, if the execution of each instruction requires a single clock and the instruction designer designs each instruction whose timing is prehensible, the designer can design the instructions so as not to cause a contention, making a contention managing system dispensable in the packet processor 1.

In the absence of such a contention managing system in the packet processor 1, when receiving signals from the controller 19, the general-purpose arithmetic operator 14 and the field extracting/writing unit 17 for selecting register ri in the general-purpose register 13 as an object to be written, the selectors 13a, 13b (FIG. 1) simply select first a signal from the general-purpose arithmetic operator 14 and then another signal from the field extracting/writing unit 17 to select the register ri.

However, a dedicated circuit (an arbitration circuit) for avoiding the contention by itself may be built into the packet processor 1 so as to change the instruction sequence and execution timing as long as the result of the arithmetic operations are not affected. Installing the dedicated circuit results in an increased size of the circuit with reduction of the amount of labor of instruction designer since instructions does not have to be designed so as to avoid contentions.

As mentioned above, the packet processor 1 of the first embodiment is equipped with the general-purpose arithmetic operator 14 and the field extracting/writing unit 17 in the form of the respective circuits, and each of these two circuits has the dedicated program counters 15, 18. Namely, unlike the conventional art, since the general-purpose arithmetic operator 14 and the field extracting/writing unit 17 perform individually (in parallel) in accordance with the respective dedicated instruction sequences (two different unique programs), the general-purpose arithmetic operator 14 can reduce the number of clocks for packet processing without a shift arithmetic operation of a field and a mask process, which updates bits other than the object field to "0". Therefore, high-speed general arithmetic operations of the general-purpose arithmetic register 14 and field extraction/write processes can drastically improve the speed of the packet processing.

The TTL subtraction process has been described here as one application of the packet processing. Other packet processes (of other object field except for the TTL field) can be realized also by changing an instruction sequence in accordance with the other process and then performing a field extraction process, an updating process, and a field write process on the packet processor 1.

Since the packet processor 1 of the illustrated embodiment can perform various packet processes by programmably operating the field extracting/writing unit 17 using changed instruction sequences, the packet processor 1 has flexibility unique to an instruction-basis processor. The packet processor 1 can execute processes at high speed keeping up with a revise of protocols and a change of functions aimed for realizing improved services as a network, a high-flexibility, high-speed packet processor 1.

The field extracting/writing unit 17 functions as a combination (shared) circuit of a field extracting circuit and a field writing circuit. This combination circuit can greatly reduce the circuit size as compared to two separate circuits, which also results in a reduced scale of the packet processor 1.

Both the field-extraction-and-field-write bit pattern and the rotation extent are designated in a single extended register ri of the general-purpose register 13 in the illustrated example. Alternatively, the field-extraction-and-field-write bit pattern and the rotation extent may be respectively designated in different registers. In another alternative, the immediates, not the register number, may be directly written into an instruction. These two alternatives also can realize high-speed field extraction/write processes.

As still another alternative to the manner of retaining an instruction sequence and transfer it to the packet processor 1, decoded instructions may be supplied form the external of the packet processor 1. In a further alternative, an instruction sequence may be retained in a dedicate memory except for the memory 2. In either alternative, if an execution timing of a field extraction instruction and a field write instruction can be properly scheduled by the instruction designer, external software such as a compiler, or an instruction scheduling circuit in the packet processor 1 can execute packet processing (field extraction/write process) like the illustrated example.

Figure 11:
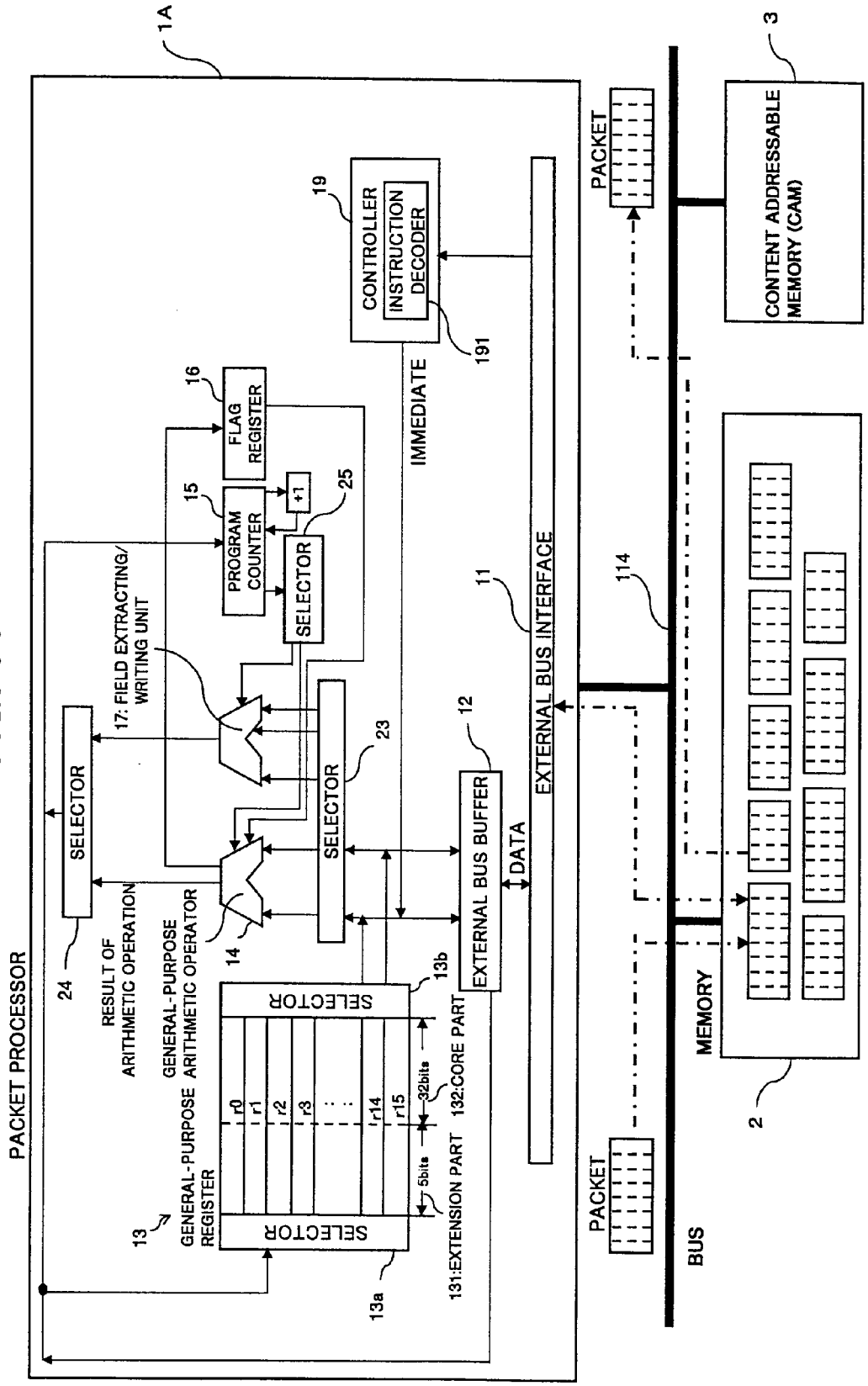
FIG. 11 is a block diagram similar to FIG. 1, but showing a packet processor according to a second embodiment of the present invention.

(B) Second Embodiment:

FIG. 11 is a block diagram similar to FIG. 1, but showing a packet processor according to a second embodiment of the present invention. A packet processor 1A similar to the packet processor 1 of the first embodiment is equipped with a field extracting/writing unit 17 and a general-purpose arithmetic operator 14, which are dedicated circuits, and the program counter 15, which is shared by the field extracting/writing unit 17 and a general-purpose arithmetic operator 14. Two selectors 23, 24 are respectively disposed at the input side and the output side of the field extracting/writing unit 17 and the general-purpose arithmetic operator 14 and are shared by the field extracting/writing unit 17 and the general-purpose arithmetic operator 14. The packet processor 1A also includes a selector 25 disposed at the output side of the program counter 15. Symbol "3" in FIG. 11 represents a retrieval memory whose function will be described below.

Like reference numbers designate similar parts or elements throughout FIG. 1 and FIG. 11.

The selector 23 selects one of the general-purpose arithmetic operator 14 or the field extracting/writing unit 17 as an input destination, while the selector 24 selects one of the general-purpose arithmetic operator 14 or the field extracting/writing unit 17 as an output source. The selector 25 selectively outputs the output of the program counter 15 to a selected one of the general-purpose arithmetic operator 14 and the field extracting/writing unit 17. The three selectors change over the output and the input between the general-purpose arithmetic operator 14 and the field extracting/writing unit 17.

In the packet processor 1A of the second embodiment, the general-purpose arithmetic operation of the general-purpose arithmetic operator 14 and the field extraction/write process of the field extracting/writing unit 17 are executed by a shared program (instruction sequence) as shown in FIG. 12.

In use of this shared program, the general-purpose arithmetic operation and the field extraction/write process cannot be executed in parallel, and hence must be sequentially executed. At this time, the packet processor 1A executes the field extraction/write process at high speed compared to the execution of the process in the form of various processes (instructions), such as a shift arithmetic operation and a mask process, using only the general-purpose arithmetic operator 14. As a result, the packet processes are executed at higher speed in the packet processor 1A. The decreased data amount of moving in the program counter 15 and the data path in the packet processor 1A, especially the data path connected to the general-purpose register 13, where data having large bit width and much data moves, contributes a decreased size of the circuit.

The extraction/retrieval process of the DA (Destination Address) of the IP address, one application of packet processing, having been executed by the packet processor 1A of the second embodiment will now be described with reference to FIGS. 12 and 13.

In the extraction/retrieval process of the DA (Destination Address) of the IP address, the DA of the IP address is extracted from the packet header, and a routing table (not shown) stored in the retrieval memory 3 is retrieved based on the extracted DA to obtain a transmit interface of the received packet, such as a port number. A memory device called CAM (Content Addressable Memory) is preferably used as the retrieval memory 3 so as to realize a high-speed retrieval process of the packet processor 1A.

The CAM 3 stores the extracted content (DA) as a key to retrieval in a storage unit, such as a register designated by the CAM 3, and outputs the result of the retrieval (e.g., MAC (media Access Control) address in the Ethernet header obtained by retrieving the routing table) based on the key to retrieval after a predetermined clock cycle. Based on the result of retrieval output from the CAM 3, the packet processor 1A updates the MAC address in the Ethernet header.

Before the execution of the instruction sequence of FIG. 12, the packet processor 1A stores the header of the packet into the registers r0 through r8 (FIG. 13) of the general-purpose register 13 from the memory 2 via the external bus buffer 12 in accordance with a data-transfer instruction from the memory 2. The data transfer instruction is decoded by the instruction decoder 191 in the controller 19.

The packet processor 1A stores a rotation extent and a field-extraction-and-field-write bit pattern into a register ri of the general-purpose register 13 other than the registers r0 through r8 for use in the extraction of the DA field from the data of the packet header stored in the registers r8 through r0. Since the DA field is stored separately in two succeeding registers r7 and r8, two sets (one for each of a replacement and an addition) of a rotation extent and a field-extraction-and-field-write bit pattern is required so as to extract the DA field. In the illustrated second embodiment of FIG. 13, the two sets of a rotation extent and a field-extraction-and-field-write bit pattern are respectively stored in registers r12, r13 of the general-purpose register 13. These storing operations are performed by an instruction informing a value (an immediate), which is put into the data-transfer instruction or other instructions from memory 2 by an instruction designer, of the register ri of the packet processor 1A. As a result, the packet processor 1A performs the individual storing operation with referring to the transferred instructions.

Figure 13:
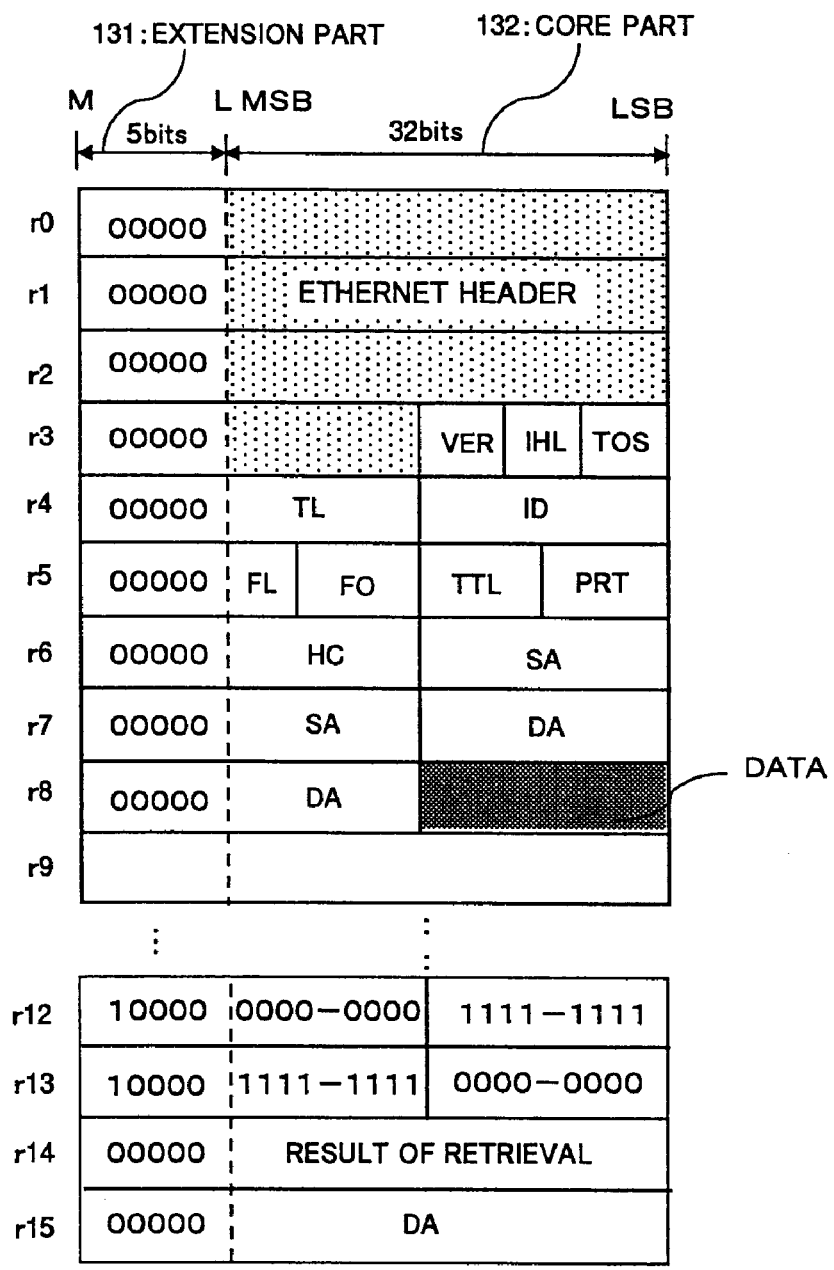
FIG. 13 is a diagram similar to FIG. 10, but showing data contents of a general-purpose register of the packet processor of FIG. 11 when the packet processor is operating.

In the packet processor 1A, the field extracting/writing unit 17, as shown in FIG. 13, extracts the upper bits of the DA field from the register r7 of the general-purpose register 13 to store it into the register r15 of the general-purpose register 13 in accordance with the instruction of the execution cycle "n+3" in the instruction sequence (a field extraction instruction "AL LDPTR r15 r7 r12"). The packet processor 1A, as shown in FIG. 12, executes an "another operation", which is not directly related to the extraction/retrieval process of the IP address, during the prior execution cycles of "n" through "n+2".

Since the upper bit of the DA field locates in the LSB side of register r7, the field extracting/writing unit 17 rotates the bit position of the DA field by the (rightward) rotation extent retained in the extension part of register r12 (values of 16; the bit string of "10000"). In accordance with the field extraction instruction of a replacement, the field extracting/writing unit 17 stores the upper bit of the DA field in the MSB side of the register r15 and updates the lower bits (the LSB side) of the register r15, where the upper bit of the DA field is not stored, to "0" in the same manner as previously described in connection with FIG. 5.

Subsequently, the field extracting/writing unit 17 extracts, as shown in FIG. 13, the lower bits of the DA field from the register r8 of the general-purpose register 13 to store it in the register r15 of the general-purpose register 13 in accordance with the instruction of the execution cycle "n+4" in the instruction sequence (a field extraction instruction "AL LDPTO r15 r8 r13") of FIG. 12. Since the lower bit of the DA field locates in the MSB side of the register r8, the field extracting/writing unit 17 rotates the bit position of the DA field by the (rightward) rotation extent retained in the Extension part of the register r13 (values of 16; the bit string of "10000").

In accordance with the field extraction instruction of an addition, the field extracting/writing unit 17 stores the lower bits of the DA field into the register r15 so as not to destroy data of the previously-stored upper bits of the DA field. Specifically, the field extracting/writing unit 17 takes a logical sum (OR) of the register r15, where the upper bits of the DA field has been stored, and the register r8, where the lower bits of the DA field is rotated to the LSB side and the other bits except for the DA field are updated to "0", in the same manner as the principle of FIG. 6. The obtained logical sum is stored into the register r15 as the updated DA.

After the field extraction process of the field extracting/writing unit 17, in the packet processor 1A, the general-purpose arithmetic operator 14 stores the extracted DA field of the register r15 into a storage area, such as a register designated by the CAM 3 as a key to retrieval in accordance with the instructions of the execution cycle of "n+5" and later which are shown in FIG. 12. The packet processor 1A also stores the result of the retrieval output from the CAM 3 based on the key to retrieval.

The packet processor 1A performs the extraction/retrieval process of the IP address (DA) which is a particular field of a packet header, by executing the instruction sequence of FIG. 12 in the general-purpose arithmetic operator 14 and the field extracting/writing unit 17. The result of the extraction/retrieval process (the updated DA) is written into the source registers r7, r8 by the field extracting/writing unit 17 in the manner described in connection with FIG. 7.

According to the packet processor of the second embodiment, the general-purpose arithmetic operator 14 and the field extracting/writing unit 17 perform in accordance with a shared instruction sequence (a shared program collectively describing unique procedures associated with the respective dedicated instructions). Parallel execution of a general-purpose arithmetic operation and a field extraction/write process as the first embodiment is not realized by the packet processor 1A of the second embodiment. But, a decreased quantity of data path, where data is moving, in the packer processor 1A contributes less in circuit scale as compared to the packet processor 1 of the first embodiment.

Figure 14:
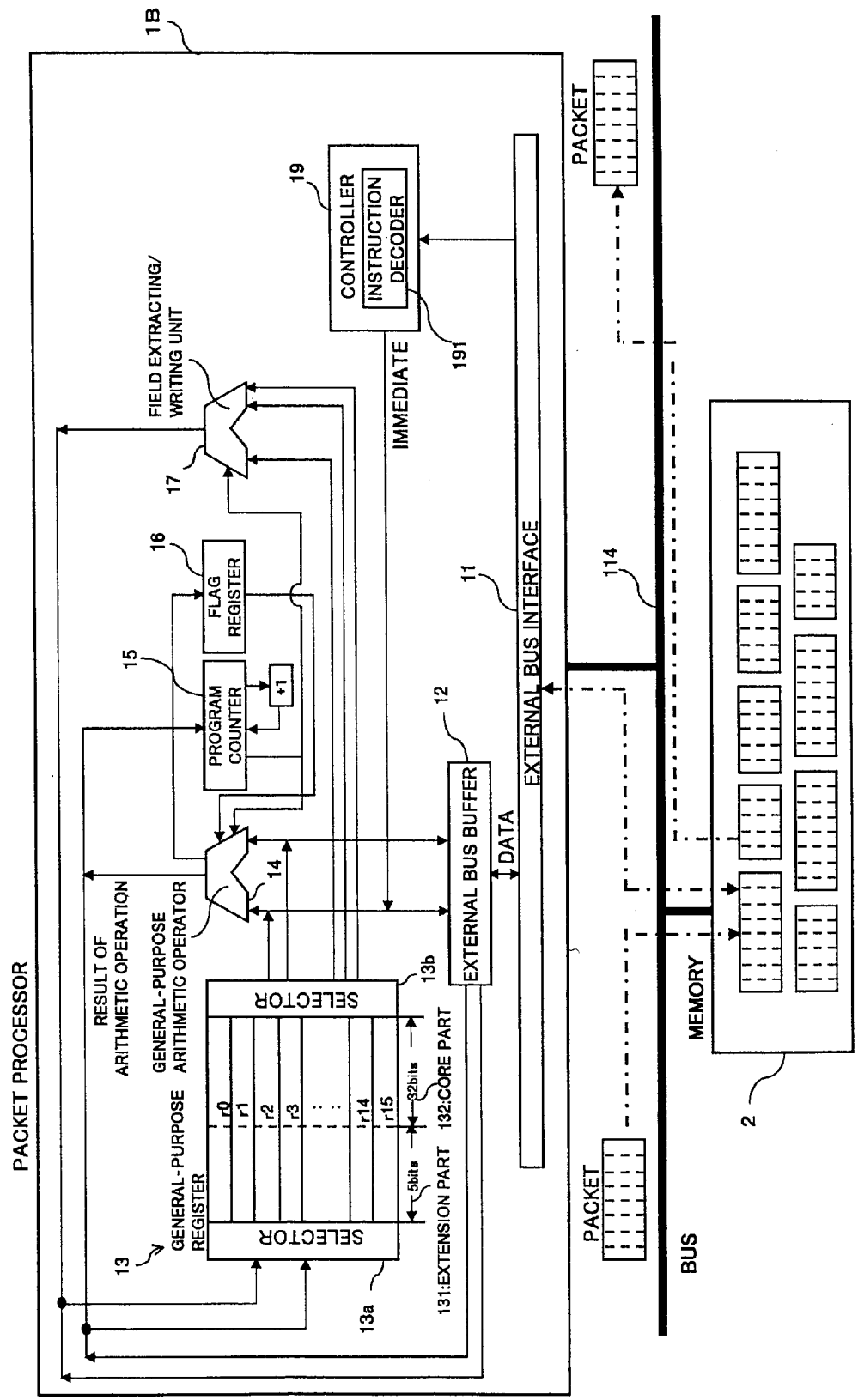
FIG. 14 is a block diagram similar to FIG. 1, but showing a packet processor according to a third embodiment of the present invention.

(C) Third Embodiment:

FIG. 14 is a block diagram similar to FIG. 1, but showing a packet processor according to third embodiment of the present invention. Likewise the packet processor 1A of the second embodiment in FIG. 11, the packet processor 1B of FIG. 14 is also equipped with a field extracting/writing unit 17 and a general-purpose arithmetic operator 14, which are dedicated circuits, and a program counter 15, which is shared by the field extracting/writing unit 17 and a general-purpose arithmetic operator 14. The field extracting/writing unit 17 and a general-purpose arithmetic operator 14 of the third embodiment respectively perform general-purpose arithmetic operations and field extraction/write processes in accordance with a shared program (common instruction sequence) likewise in the second embodiment. Like reference numbers designate similar parts or elements throughout FIG. 1 and FIG. 14, so a repetitious explanation is omitted here.

The general-purpose arithmetic operator 14 and the field extraction/writing unit 17 of the third embodiment each have a dedicated data input section, and a dedicated arithmetic operation (data) result output section, which are respectively connected to the general-purpose register 13 by respective dedicated data paths. The packet processor 1B executes a shared instruction describing unique procedures associated with the field extracting/writing unit 17 (such as LDPTR and LDPTO) and the general-purpose arithmetic operator 14 (such as NOP and SUB) at a shared execution cycle. An instruction designer describes a composite instruction that includes an instruction dedicated to field extracting/writing unit 17 and an instruction dedicated to the general-purpose arithmetic operator 14.

This composite instruction allows a field extraction/write process by the field extracting/writing unit 17 and a general-purpose arithmetic operation by the general-purpose arithmetic operator 14 for parallel performance. Despite the format of instructions of the third embodiment is, as shown in FIG. 15, different from that of the first embodiment (FIG. 9), the packet processor 1B can execute packet processing, such as the TTL subtraction process, at high speed, like the packet processor 1 of the first embodiment.

In the packet processor 1B of the third embodiment, the general-purpose arithmetic operator 14 and the field extracting/writing operator 17 are operated in accordance with a shared program describing unique procedures associated with a composite instruction that includes an instruction dedicated to the field extracting/writing unit 17 and an instruction dedicated to the general-purpose arithmetic operator 14. As a result, a general-purpose arithmetic operation and a field extraction/write process can be performed in parallel, reducing the circuit size. A small-sized packet processor (1B) having high flexibility and high speed performance can be provided with low manufacturing cost.

(D) Forth Embodiment:

The above-mentioned processes indicate that the field extracting/writing unit 17 includes the logical product (AND) circuits 17-1, 17-4, 17-6, the logical sum (OR) circuits 17-7, 17-8, the logical negative circuit (NOT) 17-3, the rightward rotation unit 17-2 and the leftward rotation unit 17-5 (FIGS. 5 through 7). The general-purpose arithmetic operator 14 usually includes the above-mentioned circuits as built-in circuits as shown in the instruction set table of FIG. 8.

Figure 16:
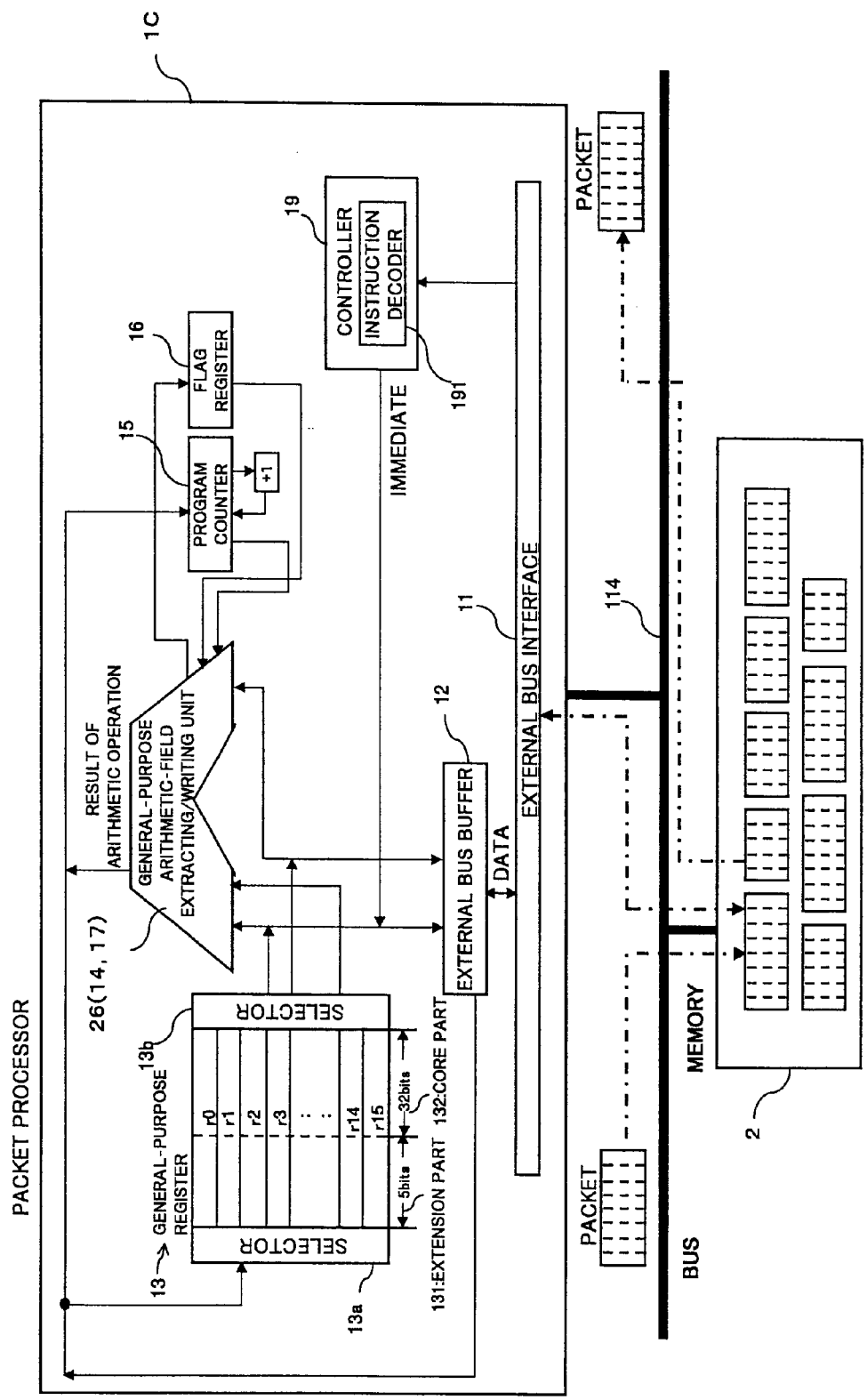
FIG. 16 is a block diagram similar to FIG. 1, but showing a packet processor according to a forth embodiment of the present invention.

Therefore, in the packet processor 1C of the forth embodiment, the general-purpose arithmetic operator 14 and the field extracting/writing unit 17, as shown in FIG. 16, are in the form of a general-purpose arithmetic-field extracting/writing unit 26, i.e., a composite form, so as to share a group of the circuits. Like reference numbers designate similar parts or elements throughout FIG. 1 and FIG. 16, so a repetitious explanation is omitted here.

The general-purpose arithmetic-field extracting/writing unit 26 allows the size of the packet processor 1C to be reduced as compared to the dedicated the general-purpose arithmetic operator 14 and the dedicated field extracting/writing unit 17. Given that a part of the circuit is shared by the general-purpose arithmetic operator 14 and the field extracting/writing unit 17 in the general-purpose arithmetic-field extracting/writing unit 26, a general-purpose arithmetic operation and a field extraction/write process cannot be executed in parallel. Upon execution of the TTL subtract process, a field extraction/write process and a general-purpose arithmetic performed are sequentially operated in a common execution cycle as shown in FIG. 17.

Even if the field extracting/writing unit 17 and the general-purpose arithmetic operator 14 shares a part of the circuit in the form of the general-purpose arithmetic-field extracting/writing unit 26, the processing speed of field execution/write process in the packet processor 1C can be increased as compared to the execution of several processes (instructions), such as a shift arithmetic operation and a mask process, using the general-purpose arithmetic operator 14 only. As a result, the packet processor 1C can guarantee high-speed packet processing.

The TTL subtraction process based on the instruction sequence of FIG. 17 is similar to that of the first embodiment, so a repetitious explanation is omitted here.

The packet processor 1C of the fourth embodiment shares the field extracting/writing unit 17 with the general-purpose arithmetic operator 14 in the form of the general-purpose arithmetic-field extracting/writing unit 26, which operates in accordance with a shared program collectively describing unique procedures associated with the respective dedicated instructions of the field extracting/writing unit 17 and the general-purpose arithmetic operator 14. As a result, a small-sized packet processor 1C having high flexibility and a high-speed performance can be provided with low manufacturing cost.

(E) Modifications:

In the above-mentioned first through fourth embodiments, the field extracting/writing unit 17 functions as a composite circuit of a field extracting circuit and a field writing circuit. The present invention should by no means be limited to illustrated example; alternatively, the field extracting/writing unit 17 may be in the form of two dedicated circuits.

Further, one kind of packet processing (the TTL subtraction process or the extraction/retrieval process of the IP address) is described to each of the foregoing embodiments for an illustrated example. Alternatively, the packet processors 1 through 1C may perform various kinds of packet processing. Throughout the execution/retrieval process of the IP address is not mentioned in the first, third and fourth embodiments, the packet processor 1, 1B, 1C may be equipped with the content addressable memory (CAM) 3 so that the extraction/retrieval process of the IP address can be in the same manner as in the second embodiment. Instead, in the second embodiment, the packet processor 1A may perform the TTL subtraction process like the first, third and fourth embodiments.

The instruction architecture described above is only one illustrative example. The packet format should no by means limited to the Ethernet format. Alternative packet formats may be used with the same result as the illustrated embodiments.

Further, the present invention should by no means be limited to foregoing illustrated embodiments, and various changes or modifications may be suggested without departing from the gist of the invention.

What is claimed is:

1. A packet processor comprising:

a general-purpose register for retaining packet data inputted from a bus;

a general-purpose arithmetic operator performing a programmed general-purpose arithmetic operation on a particular field of the packet data, which is retained by said general-purpose register, in accordance with a general-purpose arithmetic operation instruction;

a programmable field extracting circuit extracting information of an arbitrary field having an arbitrary length from said general-purpose register as object field information, on which the programmed general-purpose arithmetic operation is to be performed by said general-purpose arithmetic operator, in accordance with a field extraction instruction; and a programmable field writing circuit writing a result of the arithmetic operation by said general-purpose arithmetic operator into said general-purpose register as updated information of the extracted field, while preventing that information in other fields from being overwritten, in accordance with a field write instruction.

2. A packet processor according to claim 1, wherein said field extracting circuit and said field writing circuit is in the form of a shared composite circuit dedicated to field extraction and field write.

3. A packet processor according to claim 2, further comprising an instruction retaining section for retaining a field-extraction-and-field-write bit pattern, which represents a bit position of the particular field in said general-purpose register, and a bit rotation extent of the particular field in said general-purpose register as a composite instruction, said shared composite circuit dedicated to field extracting and field writing being operative to perform the field extraction process and the field write process based on the composite instruction retained in said instruction retaining section.

4. A packet processor according to claim 3, wherein said instruction retaining section and said general-purpose register is in the form of a composite register for retaining both the composite instruction and the packet data.

5. A packet processor according to claim 2, wherein said general-purpose arithmetic operator and said shared composite circuit, which is dedicated to field extracting and field writing, are individually operated in accordance with two different programs separately describing unique procedures associated with the respective dedicated instructions.

6. A packet processor according to claim 2, wherein said general-purpose arithmetic operator and said shared composite circuit, which is dedicated to field extracting and field writing, are operated in accordance with a shared program collectively describing unique procedures associated with the respective dedicated instructions.

7. A packet processor according to claim 2, wherein said general-purpose arithmetic operator and said shared composite circuit, which is dedicated to field extracting and field writing, are operated in accordance with a shared program describing unique procedures associated with a composite instruction that includes an instruction dedicated to field extracting and an instruction dedicated to field writing.

8. A packet processor according to claim 2, wherein said shared composite circuit, which is dedicated to field extracting and field writing, shares a component of said general-purpose arithmetic operator, said shared composite circuit being operated in accordance with a shared program collectively describing unique procedures associated with the respective dedicated instructions.

* * * * *